US012676445B2

(12) United States Patent
Sugiura

(10) Patent No.: US 12,676,445 B2
(45) Date of Patent: Jul. 7, 2026

(54) ELECTRICAL CONNECTOR WITH GROUND CONTACT

(71) Applicant: I-PEX Inc., Kyoto (JP)

(72) Inventor: Ichiro Sugiura, Machida-City (JP)

( * ) Notice: Subject to any disclaimer, the term of this patent is extended or adjusted under 35 U.S.C. 154(b) by 357 days.

(21) Appl. No.: 18/595,582

(22) Filed: Mar. 5, 2024

(65) Prior Publication Data

US 2024/0213726 A1 Jun. 27, 2024

Related U.S. Application Data

(63) Continuation of application No. PCT/JP2022/029193, filed on Jul. 28, 2022.

(30) Foreign Application Priority Data

Sep. 6, 2021 (JP) ................................ 2021-144462

(51) Int. Cl.

| | |
|---|---|
| ***H01R 4/02*** | (2006.01) |
| ***H01R 24/38*** | (2011.01) |
| ***H01R 24/40*** | (2011.01) |

(52) U.S. Cl.

CPC ............... *H01R 24/40* (2013.01); *H01R 4/02* (2013.01)

(58) Field of Classification Search

CPC .. H01R 12/598; H01R 13/6591; H01R 24/38; H01R 24/40; H01R 4/02

USPC ................................................. 439/578, 582

See application file for complete search history.

(56) References Cited

U.S. PATENT DOCUMENTS 10,389,045 B2 * 8/2019 Nishiyama ........... H01R 13/639
11,769,972 B2 * 9/2023 Nakamura ............. H01R 24/40 439/582
2012/0322304 A1 * 12/2012 Taguchi ............... H01R 13/501 439/582
2015/0357729 A1 * 12/2015 Uratani ................ H01R 12/716 439/585
2019/0190169 A1 * 6/2019 Nishiyama ............. H01R 24/40
2019/0348784 A1 * 11/2019 Yufu .................. H01R 13/6591

(Continued)

FOREIGN PATENT DOCUMENTS

JP 2010-157368 7/2010
JP 6269558 1/2018

(Continued)

OTHER PUBLICATIONS

International Search Report dated Sep. 6, 2022 for PCT/JP2022/029193.

(Continued)

*Primary Examiner* — Abdullah A Riyami
*Assistant Examiner* — Thang H Nguyen
(74) *Attorney, Agent, or Firm* — SHIPWAY IP

(57) ABSTRACT

A coaxial connector device includes a first ground bar having a first plate configured to be electrically connected with an outer conductor of a coaxial cable, a second ground bar having a second plate to be electrically connected with the outer conductor of the coaxial cable and facing the first plate to position the coaxial cable between the first plate and the second plate, and a ground contact member configured to be imparted with a ground potential. The ground contact member includes a contact part that is offset from the first plate and the second plate in the width direction and that is electrically connected to the first plate and to the second plate.

20 Claims, 20 Drawing Sheets

(56) References Cited

U.S. PATENT DOCUMENTS

| | | | | |
|---|---|---|---|---|
| 2019/0348800 | A1* | 11/2019 | Yufu | H01R 13/6582 |
| 2021/0328383 | A1* | 10/2021 | Kimura | H01R 12/75 |
| 2021/0391675 | A1* | 12/2021 | Nakamura | H01R 13/6474 |
| 2023/0068741 | A1* | 3/2023 | Sugiura | H01R 24/40 |
| 2025/0286332 | A1* | 9/2025 | Sugiura | H01R 24/40 |

FOREIGN PATENT DOCUMENTS

| | | | |
|---|---|---|---|
| JP | 2019-197684 | 11/2019 | |
| JP | 2020-184475 | 11/2020 | |
| JP | 2021-170508 | 10/2021 | |
| WO | WO-2020085401 A1 * | 4/2020 | H01R 13/6589 |
| WO | WO-2020189221 A1 * | 9/2020 | H01R 24/50 |
| WO | 2021/225122 | 11/2021 | |

OTHER PUBLICATIONS

International Preliminary Report on Patentability with Written Opinion dated Mar. 21, 2024 for PCT/JP2022/029193.

* cited by examiner

ELECTRICAL CONNECTOR WITH GROUND CONTACT

CROSS-REFERENCE TO RELATED APPLICATIONS

This application is a continuation application of PCT Application No. PCT/JP2022/029193, filed on Jul. 28, 2022, which claims the benefit of priority from Japanese Patent Application No. 2021-144462, filed on Sep. 6, 2021. The entire contents of the above listed PCT and priority application are incorporated herein by reference.

BACKGROUND

The present disclosure relates to an electrical connector.

In a connector device, a plug connector may be attached to a terminal portion of a coaxial cable and fitted to a receptacle connector mounted on a wiring board so as to electrically connect the coaxial cable to an electric circuit of the wiring board (cf. Japanese Patent No. 6269558).

In the connector device as described above, when a signal inside a connector (an electromagnetic wave transmitting an electrical signal) propagates around the connector device, there is a risk of affecting surrounding external products.

The propagation of the signal inside the connector to the surroundings may generate noise resistance.

SUMMARY

An electrical connector according to an example includes: a first ground bar having a first plate-shaped part in contact with an outer conductor of a coaxial cable; a second ground bar having a second plate-shaped part configured to face the first plate-shaped part in a fitting direction with a mating connector, disposed so as to sandwich the coaxial cable between the second plate-shaped part and the first plate-shaped part, and configured to contact the outer conductor of the coaxial cable; and a ground contact member having a ground potential applied thereto, the ground contact member being electrically connected to the outer conductor of the coaxial cable via the first ground bar and the second ground bar, in which at least one of the first ground bar and the second ground bar has a side wall part extending from an end part of the plate-shaped part in a width direction intersecting the fitting direction and an extending direction of the coaxial cable toward the opposite plate-shaped part, and the ground contact member has a contact part configured to cover the side wall part in the width direction and to contact the side wall part.

In the electrical connector according to an example, the plate-shaped parts of the first ground bar and the second ground bar in contact with the outer conductor of the coaxial cable are disposed so as to sandwich the coaxial cable in the fitting direction. In at least one of the first ground bar and the second ground bar, the side wall part extending toward the opposite plate-shaped part is formed, and the side wall part is in contact with the contact part of the ground contact member covering the side wall part in the width direction. In this manner, the side wall part extending from the ground bar in contact with the outer conductor of the coaxial cable comes into contact with the ground contact member, thereby improving shielding property (EMI characteristic) of the coaxial cable. As a result, noise resistance of the electrical connector is improved, and it is possible to effectively prevent a signal inside the electrical connector from propagating to surroundings and affecting surrounding external products.

The contact part may have elasticity in the width direction. According to such a configuration, even when a position of the coaxial cable in the width direction deviates, the deviation is absorbed by the contact part having the elasticity, and contact stability between the side wall part and the contact part can be improved. As a result, the above-described improvement in noise resistance can be more reliably achieved.

The ground contact member may include an annular fitting part fitted and connected to an annular part of the mating connector, a pair of arm parts continuous with the annular fitting part, the arm parts extending in the extending direction so as to sandwich the coaxial cable in a state of facing each other in the width direction, a base part covering an upper surface of the annular fitting part, and a pair of barrel parts continuously bent at opposite end parts of the base part in the width direction so as to cover the arm parts, the barrel parts holding the coaxial cable, and the contact part may be formed on the pair of arm parts. According to such a configuration, the barrel part can further cover the arm part while the arm part is in contact with the side wall part, thereby making it possible to improve shielding property on the side surface side of the coaxial cable. In addition, since the contact part is formed on the arm part covered by the barrel part, the arm part (contact part) is prevented from moving outwards in the width direction by the barrel part, thereby making it possible to improve contact stability between the side wall part and the contact part.

The ground contact member may include an annular fitting part fitted and connected to an annular part of the mating connector, a pair of arm parts continuous with the annular fitting part, the arm parts extending in the extending direction so as to sandwich the coaxial cable in a state of facing each other in the width direction, a base part covering an upper surface of the annular fitting part, and a pair of barrel parts continuously bent at opposite end parts of the base part in the width direction so as to cover the arm parts, the barrel parts holding the coaxial cable, and the contact part may be formed on the pair of barrel parts. According to such a configuration, when the barrel part extends to a contact region with the side wall part, contact between the side wall part and the contact part can be realized, thereby making it possible to simplify a configuration in the contact region.

An electrical connector according to an example includes: a solder part filled so as to cover an outer conductor of a coaxial cable and configured to fix the coaxial cable; and a ground contact member having a ground potential applied thereto, the ground contact member being electrically connected to the outer conductor of the coaxial cable via the solder part, in which the solder part includes an outward filling part filled outwards in a width direction of the coaxial cable, the width direction intersecting an extending direction of the coaxial cable and a fitting direction with a mating connector, and the ground contact member includes a contact part configured to cover the outward filling part in the width direction and to contact the outward filling part.

In the electrical connector according to an example, the solder part filled so as to cover the outer conductor of the coaxial cable includes the outward filling part filled outwards in the width direction of the coaxial cable, and the outward filling part is in contact with the contact part of the ground contact member covering the outward filling part in the width direction. As described above, a portion of the solder part filled outwards (side surface side) in the width direction of the coaxial cable comes into contact with the ground contact member, thereby improving shielding property (EMI characteristic) on the side surface side of the coaxial cable. As a result, noise resistance of the electrical connector is improved, and it is possible to effectively prevent a signal inside the electrical connector from propagating to surroundings and affecting surrounding external products.

According to the present disclosure, it is possible to provide an electrical connector capable of improving noise resistance.

DETAILED DESCRIPTION

Figure 1:
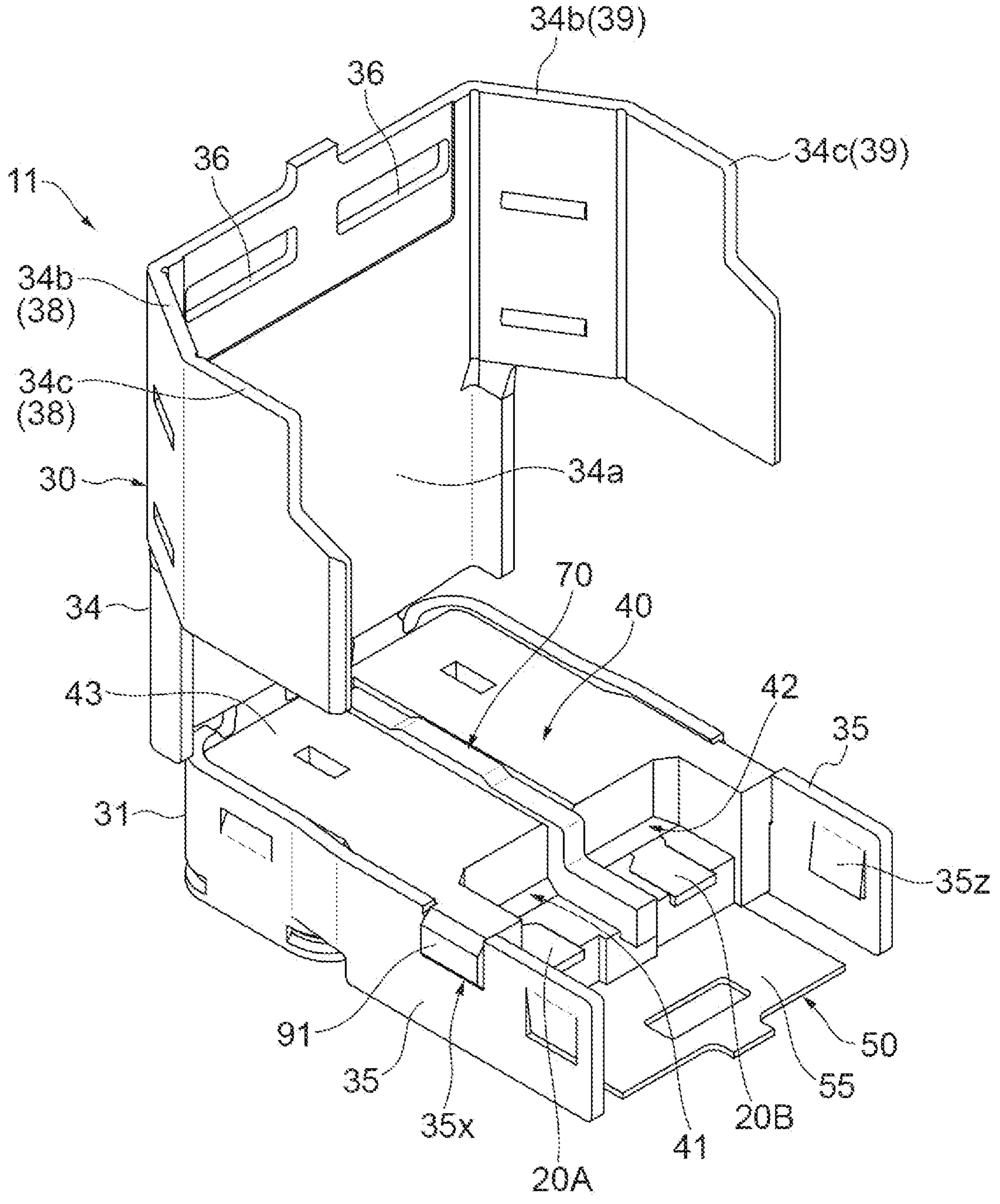
FIG. 1 is a perspective view illustrating a coaxial connector device according to an example.

A coaxial connector device according to an example will be described below with reference to the drawings. In the description, the same reference numerals are used for the same elements or elements having the same functions, and a redundant description thereof is omitted.

Figure 2:
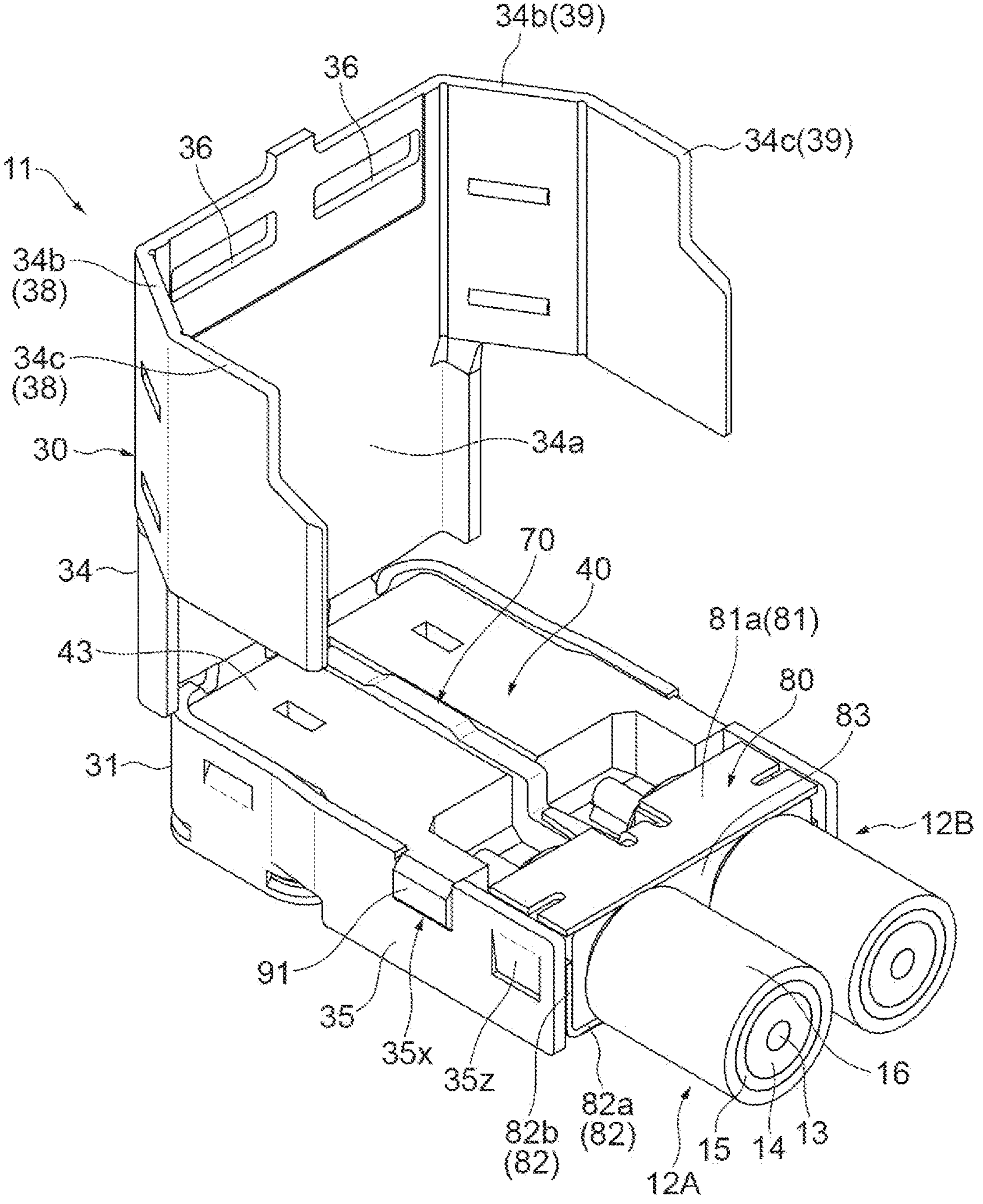
FIG. 2 is a perspective view illustrating the example coaxial connector device during an operation of mounting coaxial cables thereto.

FIG. 1 is a perspective view illustrating an example coaxial connector device 11 (electrical connector). FIG. 2 is a perspective view illustrating a process in which the example coaxial connector device 11 is mounted on end parts of coaxial cables 12A and 12B. The coaxial connector device 11 illustrated in FIGS. 1 and 2 is used by being mounted on the end parts of the two coaxial cables 12A and 12B. Each of the coaxial cables 12A and 12B includes a central conductor 13, an inner insulator 14 closely surrounding the central conductor 13, an outer conductor 15 closely surrounding the inner insulator 14, and a skin insulator 16 closely surrounding the outer conductor 15. At one end part of each of the coaxial cables 12A and 12B on which the coaxial connector device 11 is mounted, the skin insulator 16 is partially cut off to expose the outer conductor 15, and each of the outer conductor 15 and the inner insulator 14 is partially cut off to expose the central conductor 13.

It is noted that, in the following description, a “fitting direction” indicates a height direction of the coaxial connector device 11 or a fitting direction of the coaxial connector device 11 and a mating connector device 100 (cf. FIG. 7); an “extending direction of the coaxial cable” indicates an extending direction of the coaxial cables 12A and 12B; and a “width direction” indicates a width direction (width direction of the coaxial connector device 11) intersecting the fitting direction and the extending direction of the coaxial cable.

Figure 3:
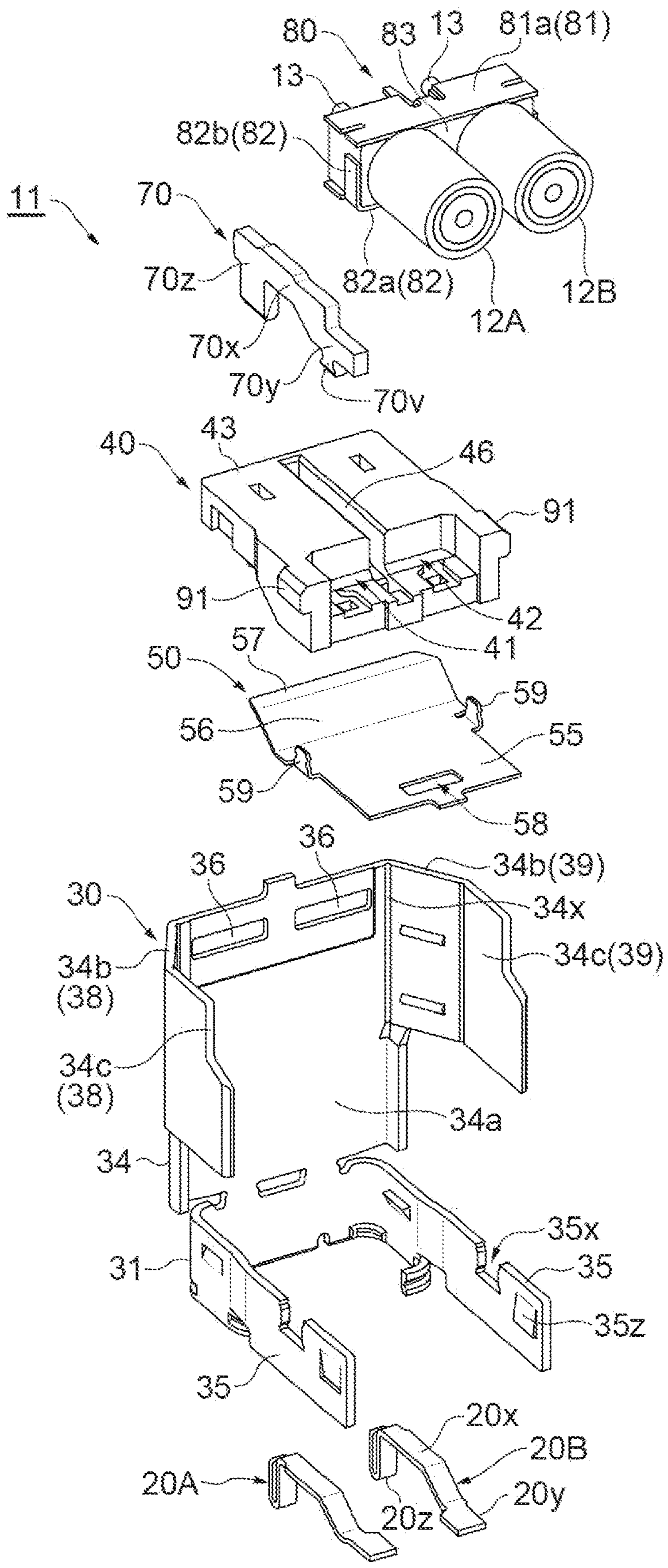
FIG. 3 is an exploded perspective view illustrating the example coaxial connector device.

FIG. 3 is an exploded perspective view illustrating the example coaxial connector device 11. As illustrated in FIG. 3, the coaxial connector device 11 includes, as main components, two signal contact members 20A and 20B, a ground contact member 30, and a conductive member 50. Further, the coaxial connector device 11 may include an insulating housing 40.

The insulating housing 40 is formed of an insulating material such as synthetic resin. The insulating housing 40 supports the signal contact members 20A and 20B and the ground contact member 30 in a state of being insulated from each other. The insulating housing 40 includes a first support part 41 related to the support of the signal contact member 20A, a second support part 42 related to the support of the signal contact member 20B, and a base part 43. The first support part 41 and the second support part 42 are disposed adjacent to each other in the width direction of the coaxial connector device 11.

Protruding parts 91 protruding outwards in the width direction are provided on the outer surfaces of the first support part 41 and the second support part 42 in the width direction. The protruding part 91 is a portion that is fitted into a recessed part 35*x* (which will be described further below) of an arm part 35 of the ground contact member 30 and fixes the position of the insulating housing 40 with respect to the ground contact member 30 at the time of assembling the coaxial connector device 11 (cf. FIG. 2).

Insertion ports 49 (cf. FIG. 13A) which are recessed parts are formed at opposite end portions in the width direction of the lower surfaces of the first support part 41 and the second support part 42. The insertion port 49 is a portion into which a connection part 59 (which will be described further below) of the conductive member 50 is inserted. When the connection part 59 is inserted into the insertion port 49, the position of the conductive member 50 is fixed with respect to the insulating housing 40.

The base part 43 is a portion that is continuous with the first support part 41 and the second support part 42 in the extending direction of the coaxial cables 12A and 12B, and is a portion located closer to the tip direction (forward direction) of the coaxial cables 12A and 12B than to the first support part 41 and the second support part 42. A recessed part 46 for fixing an isolation characteristic improvement part 70 to be described later is formed at a central portion of the base part 43 in the width direction of the coaxial connector device 11. The recessed part 46 is formed in the extending direction of the coaxial cables 12A and 12B from a portion sandwiched between the first support part 41 and the second support part 42 to a tip portion of the base part 43.

The ground contact member 30 is made of a conductive material (for example, a conductive material having elasticity). A ground potential is applied to the ground contact member 30, and the ground contact member 30 is electrically connected to the outer conductors 15 of the coaxial cables 12A and 12B via ground bars 81 and 82 (first ground bar and second ground bar), which will be described further below. The ground contact member 30 includes an annular fitting part 31, a pair of arm parts 35 and 35, and a shell part 34.

Figure 6:
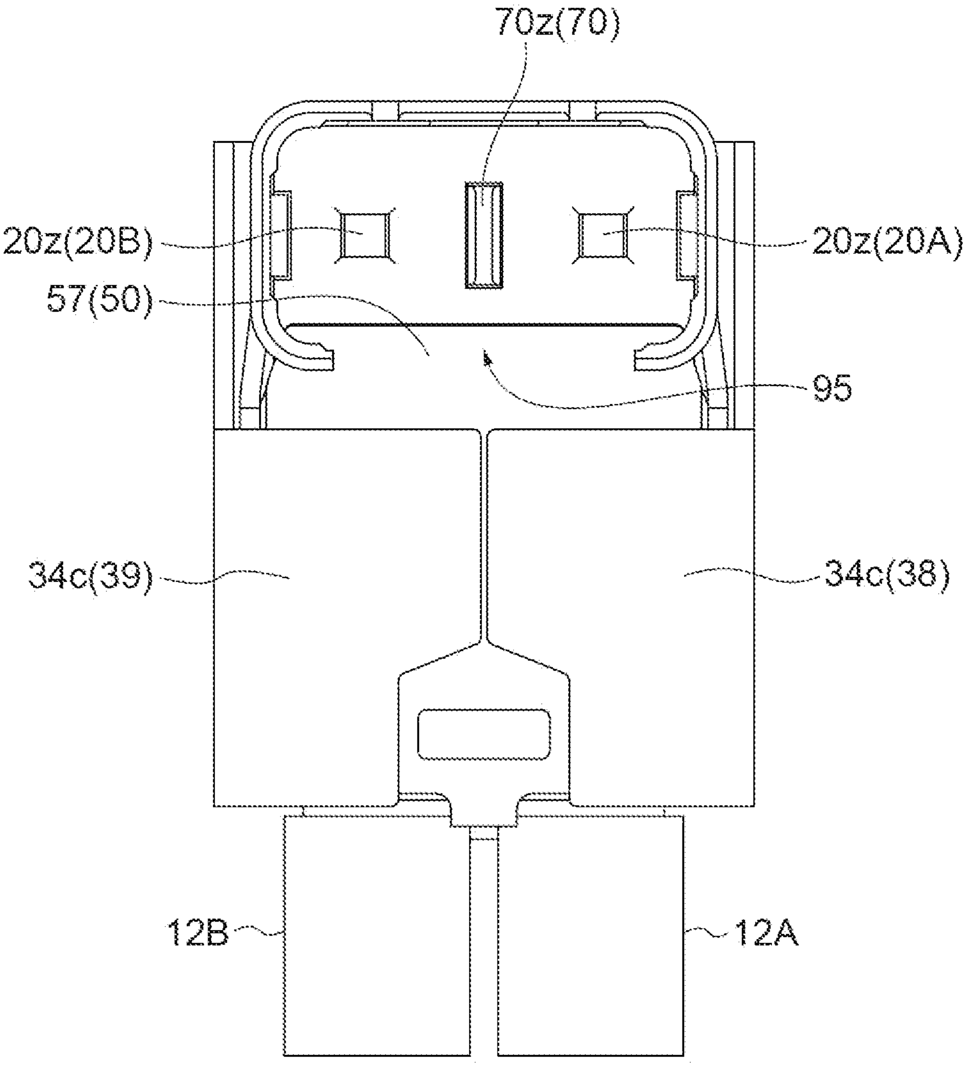
FIG. 6 is a bottom view of the coaxial connector device of FIG. 5.
Figure 7:
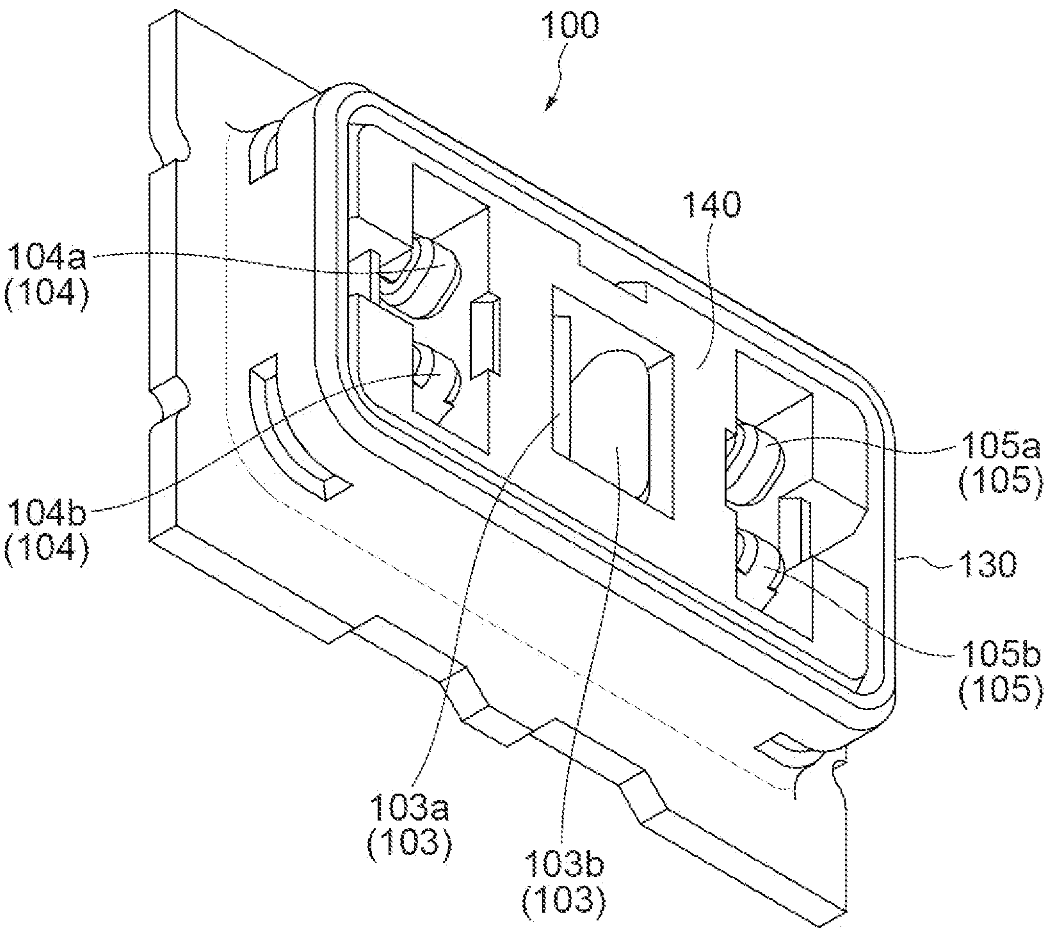
FIG. 7 is a perspective view illustrating an example mating connector device that is connectable with the example coaxial connector device.

The annular fitting part 31 is a portion that partially surrounds a part (e.g., the base part 43) of the insulating housing 40 and is fitted and connected to an annular fitting part 130 which is a ground contact part of the mating connector device 100 (cf. FIG. 7). The annular fitting part 31 is formed in an open-loop shape, or a substantially cylindrical shape in which a rear end portion thereof is not continuous and has an opening part 95 (cf. FIG. 6) formed therein.

The pair of arm parts 35 and 35 is continuous with the annular fitting part 31 and is a portion extending in the extending direction of the coaxial cables 12A and 12B so as to sandwich the coaxial cables 12A and 12B in a state of facing each other in the width direction of the coaxial connector device 11. The one arm part 35 extends in the extending direction along the outer surface of the first support part 41. The other arm part 35 extends in the extending direction along the outer surface of the second support part 42. Each of the pair of arm parts 35 and 35 is formed with the recessed part 35*x* fitted to the protruding part 91 of the insulating housing 40.

Figure 12A:
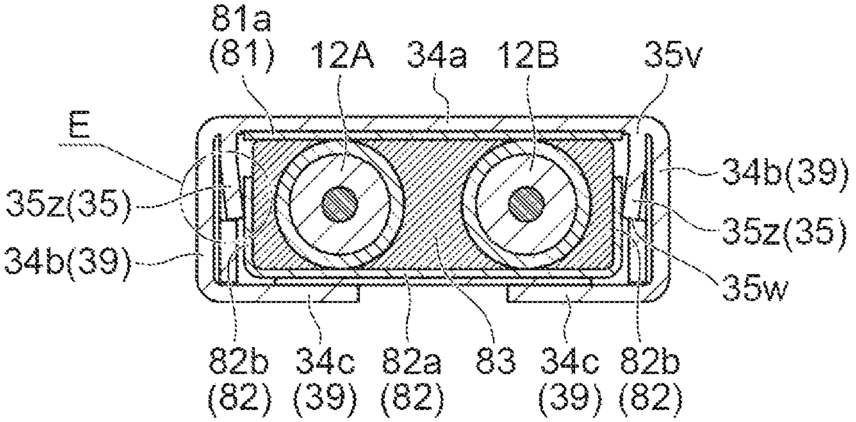
FIG. 12A is a cross-sectional view of the coaxial connector device of FIG. 8, taken along line D-D.

In addition, a contact part 35*z* in contact with a side wall part (or side wall) 82*b* (which will be described further below) of the ground bar 82 of the cable fixing part 80 is formed at a rear end part of each of the pair of arm parts 35 and 35. The contact part 35*z* is formed by pushing (bending) a cutout portion formed at the rear end part of the arm part 35 inwards in the width direction, and is a portion protruding inwards in the width direction. In this manner, the contact part 35*z* formed by being bent inwards in the width direction has elasticity (or flexibility) in the width direction. Namely, the contact part 35*z* may be biased in the width direction toward the side wall 82*b* of the ground bar 82. The arm part 35 has a base end 35*v* that is attached to the shell part 34, and a free end 35*w* located opposite the base end 35*v*, that forms the contact part 35*z*. The base end 35*v* is spaced away from the ground bars 81 and 82 in the width direction, and the free end 35*w* contacts the side wall part 82*b* of the ground bar 82. Accordingly, the arm part 35 extends toward the ground bars 81 and 82 in the width direction, from the base end 35*v* to the free end 35*w*. As illustrated in FIG. 12A, the contact part 35*z* covers the side wall part 82*b* of the ground bar 82 in the width direction and contacts the side wall part 82*b*. Namely, the contact part 35*z* is located adjacent to the side wall part 82*b* in the width direction, the contact part 35*z* extending in the fitting direction (or height direction) and in the extension direction to at least partially cover or overlap the side wall part 82*b*, and extending additionally in the width direction to contact the side wall part 82*b*.

Figure 5:
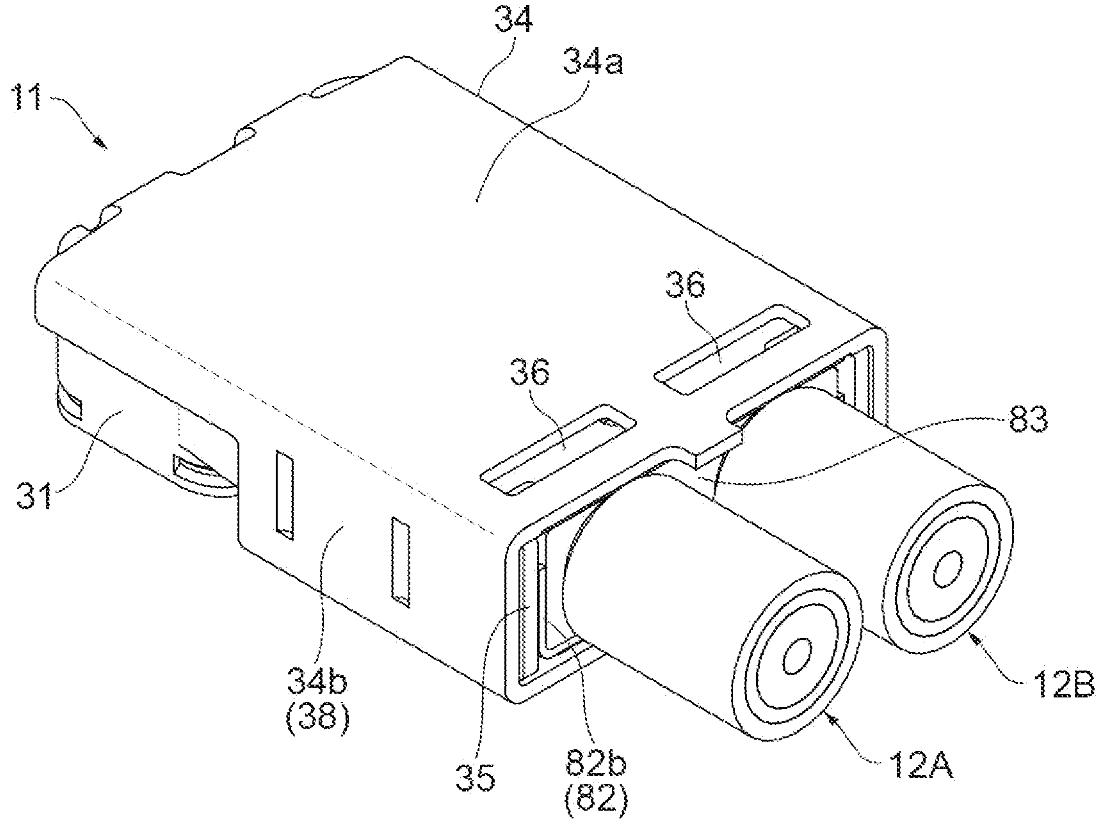
FIG. 5 is a perspective view of the example coaxial connector device with the coaxial cables mounted thereto.

As illustrated in FIG. 3, the shell part 34 includes a base plate 34*a* (base part) that covers the upper surface of the annular fitting part 31, a first fixing part 38 (barrel part) related to fixing of the coaxial cable 12A, and a second fixing part 39 (barrel part) related to fixing of the coaxial cable 12B. The base plate 34*a* is continuous with the tip of the annular fitting part 31 and extends rearwards to a position covering the ground bar 81 (which will be described further below) at an upper part of the cable fixing part 80 (which will be described further below) at a bent position thereof. It is noted that the bent position of the base plate 34*a* refers to a position of the base plate 34*a* in a state in which the shell part 34 is bent such that the base plate 34*a* and the upper surface of the annular fitting part 31 illustrated in FIG. 5 are in contact with each other with the position of the base plate 34*a* where the angle formed by the shell part 34 and the arm part 35 illustrated in FIG. 3 is 90 degrees as an upright position.

As illustrated in FIG. 3, the first fixing part 38 holds the coaxial cable 12A. The first fixing part 38 is a portion continuously extending to an outer edge part 34*x* in the width direction of a rear end portion of the base plate 34*a* (a rearward portion of a portion covering the upper surface of the annular fitting part 31 in the base plate 34*a*). The first fixing part 38 is configured to be bendable, and includes a tightening part 34*b* that covers the arm part 35 from the outside in the width direction at the bent position, and a tightening part 34*c* that covers the cable fixing part 80 (e.g., the lower ground bar 82 to be described later) from below. The tightening part 34*b* covers the arm part 35 by being bent at a location continuous with the base plate 34*a*. The tightening part 34*c* covers the lower ground bar 82 by being bent at a location continuous with the tightening part 34*b*. In this manner, the first fixing part 38 holds the coaxial cable 12A fixed by the cable fixing part 80 by holding the cable fixing part 80 so as to cover the cable fixing part 80 instead of directly fastening the coaxial cable 12A. The configuration of the second fixing part 39 is similar to the configuration of the first fixing part 38 (the same applies in that the coaxial cable 12A is replaced with the coaxial cable 12B and the tightening parts 34*b* and 34*c* are provided). That is, the second fixing part 39 holds the coaxial cable 12B fixed by the cable fixing part 80 by holding the cable fixing part 80 so as to cover the cable fixing part 80 instead of directly fastening the coaxial cable 12B.

The cable fixing part 80 is configured to fix the coaxial cables 12A and 12B. The cable fixing part 80 includes the plate-shaped ground bars 81 and 82 (first ground bar and second ground bar) formed of a conductive material, and a solder part 83 having conductivity. The ground bars 81 and 82 are disposed to face each other in the vertical direction. The solder part 83 is filled between the ground bars 81 and 82 and the coaxial cables 12A and 12B to fix the coaxial cables 12A and 12B. The solder part 83 is filled so as to cover the outer conductor 15, and the ground bar 81 covers the upper surface of the solder part 83 and the ground bar 82 covers the lower surface of the solder part 83. As a result, the ground bars 81 and 82 and the outer conductor 15 are electrically connected to each other.

In the upper ground bar 81, a tip portion of a central portion in the width direction is bent downwards, passes through the inside of the solder part 83, and is connected to the isolation characteristic improvement part 70 (which will be described further below) (cf. FIG. 9). As described above, since the one ground bar 81 and the isolation characteristic improvement part 70 are in contact with each other, the isolation characteristic improvement part 70 is electrically connected to the outer conductors 15 of the coaxial cables 12A and 12B via the ground bar 81.

Figure 4:
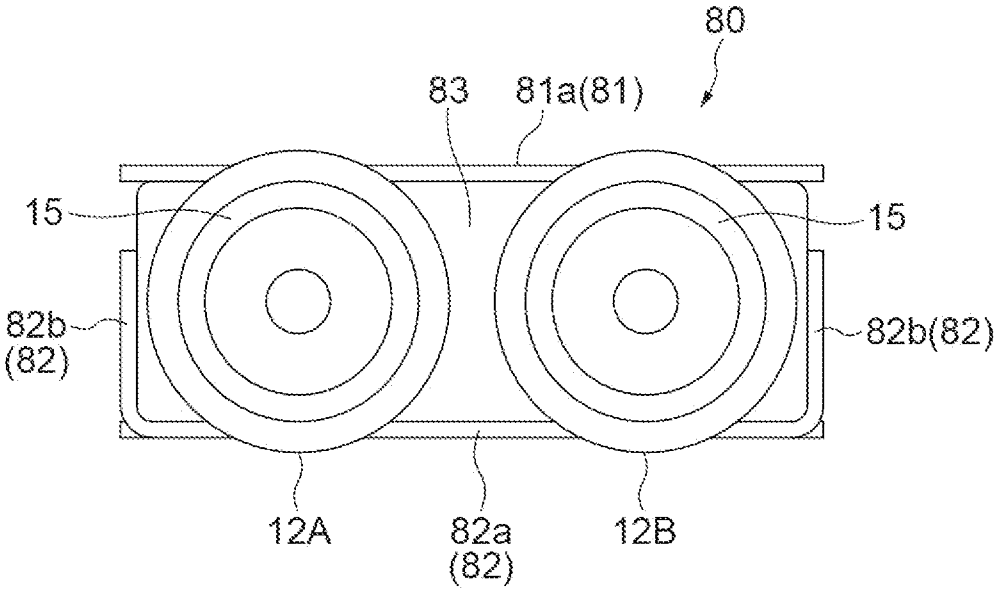
FIG. 4 is a rear view illustrating a cable fixing part of the example coaxial connector device.

The example ground bars 81 and 82 included in the cable fixing part 80 will be described with reference to FIG. 4. FIG. 4 is a rear view illustrating the cable fixing part 80 included in the coaxial connector device 11. As illustrated in FIG. 4, the ground bar 81 has a plate-shaped part 81*a* (first plate-shaped part or first plate) that comes into contact with each of the outer conductors 15 of the coaxial cables 12A and 12B. The ground bar 82 has a plate-shaped part 82*a* (second plate-shaped part or second plate) that faces the plate-shaped part 81*a* in the fitting direction with the mating connector device 100, is disposed so as to sandwich the coaxial cables 12A and 12B between the plate-shaped part 82*a* and the plate-shaped part 81*a*, and is in contact with each of the outer conductors 15 of the coaxial cables 12A and 12B. Further, the ground bar 82 has a pair of side wall parts 82*b* and 82*b* extending from end parts in the width direction of the plate-shaped part 82*a* toward the plate-shaped part 81*a*. The pair of side wall parts 82*b* and 82*b* are disposed to face each other so as to sandwich the coaxial cables 12A and 12B and the solder part 83 in the width direction. As illustrated in FIG. 12A, the pair of side wall parts 82*b* and 82*b* is a portion that comes into contact with the contact part 35*z* of the ground contact member 30.

Referring back to FIG. 3, the signal contact members 20A and 20B are formed of a conductive material. The signal contact member 20A is a conductive member connected to the central conductor 13 of the coaxial cable 12A and connected to a signal contact part 104 (cf. FIG. 7) of the mating connector device 100. The signal contact member 20B is connected to the central conductor 13 of the coaxial cable 12B and connected to a signal contact part 105 (cf. FIG. 7) of the mating connector device 100.

The signal contact member 20A has a first portion 20*x*, a second portion 20*y*, and a third portion 20*z*. The signal contact member 20A is supported by the first support part 41. The second portion 20*y* is a portion extending in the extending direction of the coaxial cable 12A, and is a portion in contact with the central conductor 13 of the coaxial cable 12A on the upper surface thereof. The first portion 20*x* is a portion that is continuous with the tip of the second portion 20*y* and extends forwards. The first portion 20*x* has a portion that is continuous with the tip of the second portion 20*y* and obliquely extends upwards, and a portion that is continuous with the obliquely extending portion and extends in the extending direction. The third portion 20*z* is a portion formed in a U-shape so as to be continuous with the tip of the first portion 20*x*, extend downwards, and turn back at a lower end of a portion extending downwards in order to extend upwards. The third portion 20*z* is connected to the signal contact part 104 (cf. FIG. 7) of the mating connector device 100 at the portion formed in the U-shape. The configuration of the signal contact member 20B is similar to the configuration of the signal contact member 20A (the same applies in that the coaxial cable 12A is replaced with the coaxial cable 12B, and the first portion 20*x*, the second portion 20*y*, and the third portion 20*z* are provided).

The conductive member 50 includes a rear ground connection part 55, an inclined part 56 that is continuous with the rear ground connection part 55, and a front ground connection part 57 that is continuous with the inclined part 56.

Figure 10:
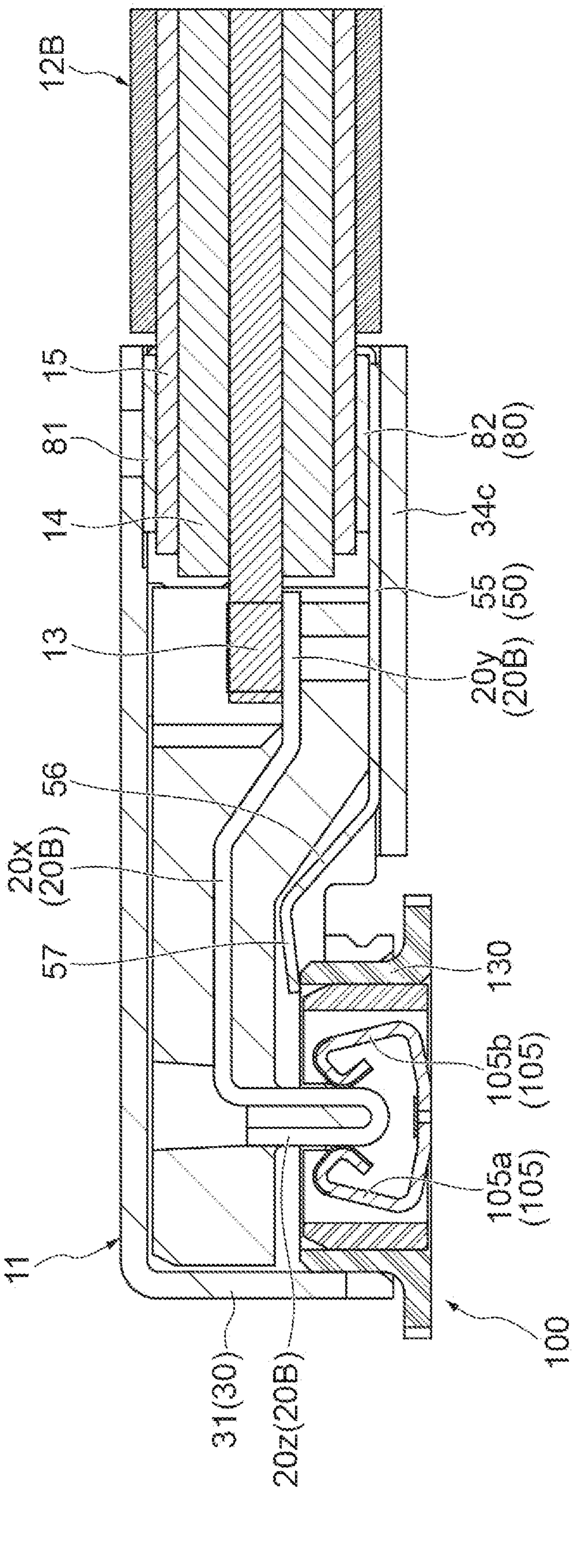
FIG. 10 is a cross-sectional view of the coaxial connector device of FIG. 8, taken along line B-B.

The rear ground connection part 55 is a portion on a flat plate connected to (in contact with) the ground contact member 30, for example, the tightening part 34*c* of the first fixing part 38 and the second fixing part 39 (cf. FIG. 10). A notch 58 is formed at a central portion of the rear end of the rear ground connection part 55 in the width direction. By filling the notch 58 with solder, the lower ground bar 82 and the conductive member 50 are electrically connected to each other. This ensures improved shielding property by reliable contact and mechanical connection by firm connection. It is noted that a penetrating part 36 formed at the rear end part of the base plate 34*a* is filled with solder, whereby the upper ground bar 81 and the ground contact member 30 are electrically connected to each other. A timing at which such soldering is performed is after caulking of the first fixing part 38 and the second fixing part 39 which are barrel parts. The connection parts 59 protruding upwards are respectively provided at the opposite end portions of the front end part of the rear ground connection part 55 in the width direction. By inserting the connection part 59 into the insertion port 49 (cf. FIG. 13A) of the insulating housing 40, the position of the rear ground connection part 55 is fixed with respect to the insulating housing 40. The inclined part 56 is a portion that is continuous with the front end of the rear ground connection part 55 and extends forwards in a state of being inclined, and has a shape inclined in the upper oblique direction according to the inclined shape of the lower surface of the insulating housing 40.

The front ground connection part 57 is a flat plate-shaped portion connected to (in contact with) the annular fitting part 130 which is a ground contact part of the mating connector device 100 (cf. FIG. 10). The front ground connection part 57 is a portion that is continuous with the front end of the inclined part 56 and extends forwards in a state of being inclined downwards. The front ground connection part 57 has a tip portion disposed in the opening part 95 (cf. FIG. 6) of the annular fitting part 31, and is connected to the annular fitting part 130 at the tip portion (cf. FIG. 10). The front ground connection part 57 is continuously formed in the width direction which is the arrangement direction of the signal contact member 20A and the signal contact member 20B. Here, the continuous formation means that a notch, a gap, or the like is not formed. The front ground connection part 57 overlaps at least a part (both signal lines in the present example) of two signal lines when viewed from the fitting direction.

The conductive member 50 further includes the isolation characteristic improvement part 70 configured as a member separately provided from the plate-shaped member including the rear ground connection part 55, the inclined part 56, and the front ground connection part 57 described above. As described above, the isolation characteristic improvement part 70 is made of a conductive material which is a member separately provided from the front ground connection part 57 and the like.

The isolation characteristic improvement part 70 is configured to extend in the extending direction of the signal contact member 20A and the signal contact member 20B between the signal contact member 20A and the signal contact member 20B. The isolation characteristic improvement part 70 prevents signal propagation between the signal contact member 20A and the signal contact member 20B. The isolation characteristic improvement part 70 is a wall-shaped member having surfaces facing each of the signal contact members 20A and 20B. The isolation characteristic improvement part 70 is disposed between the signal contact member 20A and the signal contact member 20B so as to block at least a part of a region between the signal contact member 20A and the signal contact member 20B.

Figure 9:
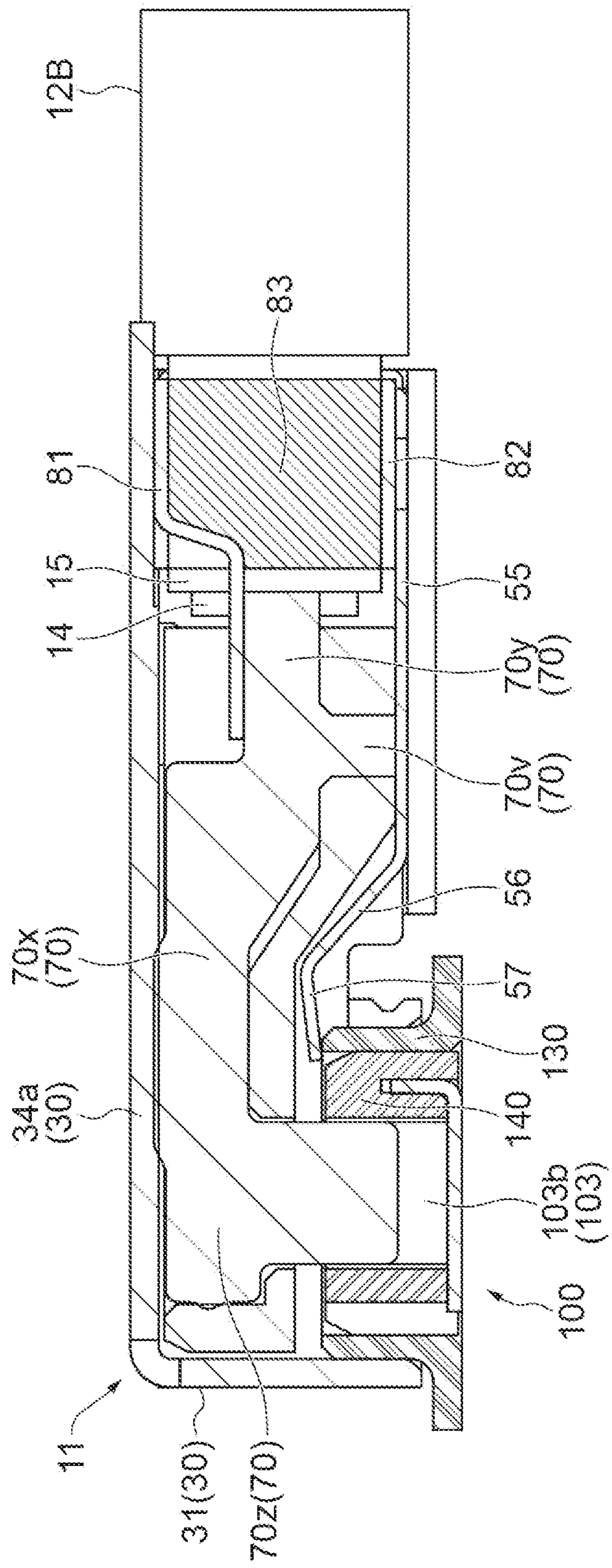
FIG. 9 is a cross-sectional view of the coaxial connector device of FIG. 8, taken along line A-A.

As illustrated in FIG. 9, the isolation characteristic improvement part 70 may be disposed between the signal contact member 20A and the signal contact member 20B so as to block the entire region between the signal contact member 20A and the signal contact member 20B. As illustrated in FIGS. 9 and 10, the area of the isolation characteristic improvement part 70 viewed from the width direction is larger than the areas of the signal contact member 20A and the signal contact member 20B viewed from the width direction.

As illustrated in FIG. 9, the isolation characteristic improvement part 70 includes a first portion 70*x*, a second portion 70*y*, a third portion 70*z*, and a fourth portion 70*v*. The second portion 70*y* is a portion extending along the second portions 20*y* of the signal contact members 20A and 20B. The second portion 70*y* is connected to the ground bar 81 electrically connected to the outer conductors 15 of the coaxial cables 12A and 12B and disposed on the upper surface of the second portion 70*y*. The first portion 70*x* is a portion extending along the first portions 20*x* of the signal contact members 20A and 20B. At least a part of the upper end part of the first portion 70*x* is in contact with the base plate 34*a* of the shell part 34 (cf. FIG. 9). The third portion 70*z* is a portion extending downwards along the third portion 20*z* of the signal contact members 20A and 20B. The third portion 70*z* is connected to (in contact with) a contact part 103 of the ground contact part of the mating connector device 100. The fourth portion 70*v* is a portion that is continuous with the first portion 70*x* and extends downwards. The fourth portion 70*v* is a portion press-fitted into the insulating housing 40.

FIG. 7 is a perspective view illustrating the mating connector device 100 having the coaxial connector device 11 connected thereto. As illustrated in FIG. 7, the mating connector device 100 includes the signal contact parts 104 and 105, the annular fitting part 130 and the contact part 103 which are ground contact parts, and an insulating housing 140.

The insulating housing 140 is formed of an insulating material such as synthetic resin. The insulating housing 140 supports the signal contact parts 104 and 105 and the annular fitting part 130 and the contact part 103 which are the ground contact parts in a state of being insulated from each other. Each of the signal contact parts 104 and 105 is formed of a conductive material. The signal contact part 104 has a pair of contact portions 104*a* and 104*b*. The contact portions 104*a* and 104*b* contact (are connected to) the third portion 20*z* so as to sandwich the third portion 20*z* of the signal contact member 20A therebetween. The signal contact part 105 has a pair of contact portions 105*a* and 105*b*. The contact portions 105*a* and 105*b* contact (are connected to) the third portion 20*z* so as to sandwich the third portion 20*z* of the signal contact member 20B therebetween.

The contact part 103 is formed of a conductive material. The contact part 103 has a pair of contact portions 103*a* and 103*b*. The contact portions 103*a* and 103*b* come into contact with (are connected to) the third portion 70*z* so as to sandwich the third portion 70*z* of the isolation characteristic improvement part 70 therebetween. The ground contact part is formed of a conductive material. The annular fitting part 130 of the ground contact part is fitted and connected to the annular fitting part 31 of the ground contact member 30.

Figure 8:
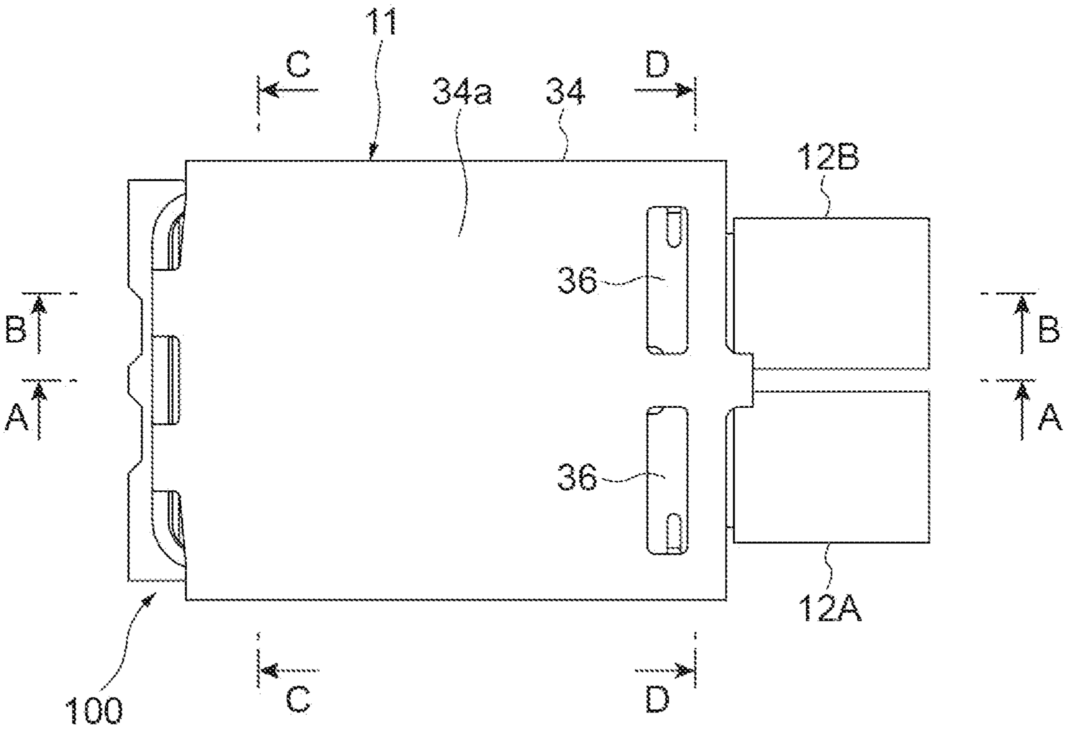
FIG. 8 is a plan view illustrating a state in which the example coaxial connector device is mechanically and electrically connected to the example mating connector device.
Figure 11:
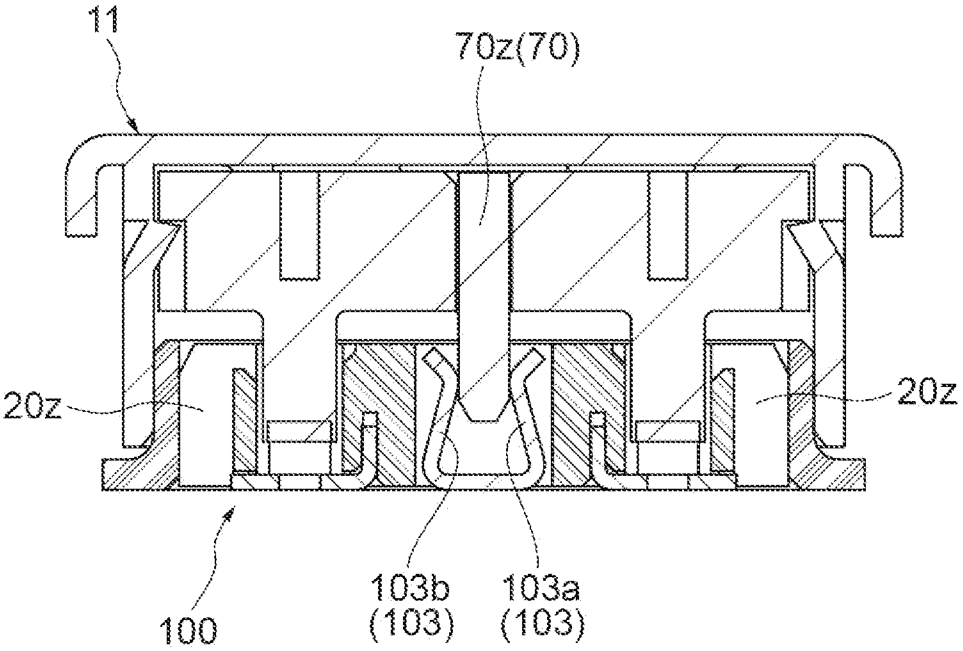
FIG. 11 is a cross-sectional view of the coaxial connector device of FIG. 8, taken along line C-C.
Figure 12B:
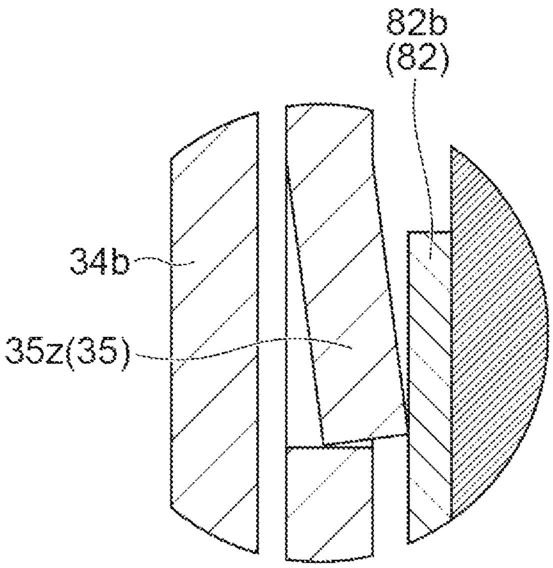
FIG. 12B is an enlarged view of a portion E of FIG. 12A.

FIG. 8 is a plan view illustrating a state in which the coaxial connector device 11 is mechanically and electrically connected to the mating connector device 100 in a state of being mounted on the end parts of the coaxial cables 12A and 12B. FIG. 9 is a cross-sectional view taken along line A-A in FIG. 8. FIG. 10 is a cross-sectional view taken along line B-B in FIG. 8. FIG. 11 is a cross-sectional view taken along line C-C in FIG. 8. FIG. 12A is a cross-sectional view illustrating a cross section taken along line D-D in FIG. 8. FIG. 12B is an enlarged view of a portion E illustrated in FIG. 12A.

As illustrated in FIGS. 9 and 10, in a state in which the coaxial connector device 11 is coupled to the mating connector device 100, the annular fitting part 31 of the ground contact member 30 in the coaxial connector device 11 is fitted and connected to the annular fitting part 130 of the ground contact part of the mating connector device 100.

In the fitted and connected state, as illustrated in FIG. 10, the third portion 20*z* of the signal contact member 20B to which the second portion 20*y* and the central conductor 13 of the coaxial cable 12B are connected comes into contact with the pair of contact portions 105*a* and 105*b* of the signal contact parts 105 of the mating connector device 100 (the signal contact member 20A is in contact with the pair of contact portions 104*a* and 104*b* of the signal contact part 104). As a result, the central conductors 13 of the coaxial cables 12A and 12B are electrically connected to signal terminals provided on the mounting surface of a circuit board through the signal contact members 20A and 20B of the coaxial connector device 11 and the signal contact parts 104 and 105 of the mating connector device 100.

Further, in the fitted and connected state, as illustrated in FIG. 10, the rear ground connection part 55 of the conductive member 50 is in contact with the tightening part 34*c* of the ground contact member 30 and the ground bar 82 of the cable fixing part 80. Additionally, the front ground connection part 57 is in contact with the annular fitting part 130 which is a ground contact part of the mating connector device 100. The ground bar 82 is electrically connected to the outer conductors 15 of the coaxial cables 12A and 12B. As a result, the outer conductors 15 of the coaxial cables 12A and 12B are electrically connected to a ground potential part provided on the circuit board through the ground contact member 30 and the conductive member 50 of the coaxial connector device 11 and the annular fitting part 130 of the mating connector device 100.

Furthermore, in the fitted and connected state, as illustrated in FIG. 9, the isolation characteristic improvement part 70 connected to the ground bar 81 extends in the extending direction of the signal contact member 20A and the signal contact member 20B and is disposed between the signal contact member 20A and the signal contact member 20B. As illustrated in FIG. 11, the third portion 70*z* of the isolation characteristic improvement part 70 is in contact with the pair of contact portions 103*a* and 103*b* of the contact part 103 of the ground contact part of the mating connector device 100. As a result, the isolation characteristic improvement part 70 is provided between signal lines so as to prevent signal propagation between the signal lines. It is noted that the isolation characteristic improvement part 70 is electrically connected to the ground potential part provided on the circuit board.

In addition, as illustrated in FIGS. 12A and 12B, in the fitted and connected state, in the coaxial connector device 11, the contact parts 35*z* of the pair of arm parts 35 and 35 cover at least a part of the respective side wall parts 82*b* of the ground bar 82 in the width direction and are in contact with a part of the respective side wall parts 82*b*. Namely, the contact parts 35*z* are located adjacent to the respective side wall parts 82*b* in the width direction, the contact parts 35*z* extending in the fitting direction (or height direction) and in the extension direction to at least partially cover or overlap the respective side wall parts 82*b*, and extending additionally in the width direction to contact the respective side wall parts 82*b*. Further, in the coaxial connector device 11, the base plate 34*a* is in contact with the plate-shaped part 81*a* of the ground bar 81, and the tightening part 34*c* is in contact with the plate-shaped part 82*a* of the ground bar 82. As described above, in the coaxial connector device 11, the ground contact member 30 and the ground bars 81 and 82 are in contact with each other in both the width direction and the fitting direction, thereby improving shielding property.

Next, an assembly method of the coaxial connector device 11 will be described with reference to FIGS. 13A to 13D, 14A and 14B. FIGS. 13A to 13D are diagrams illustrating the assembly method of the coaxial connector device 11. FIGS. 14A and 14B are diagrams illustrating the assembly method of the coaxial connector device 11, and are diagrams illustrating a process subsequent to FIG. 13D.

Figures 13A, 13B, 13C, 13D:
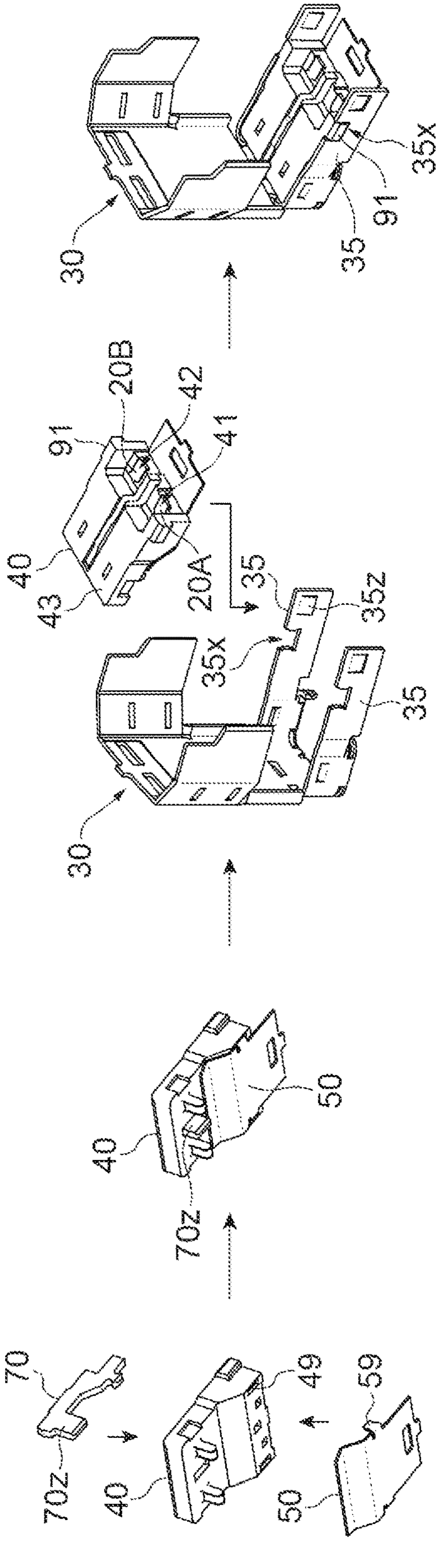
FIGS. 13A to 13D are diagrams illustrating operations during an assembly method of the coaxial connector device according to an example.
Figure 14B:
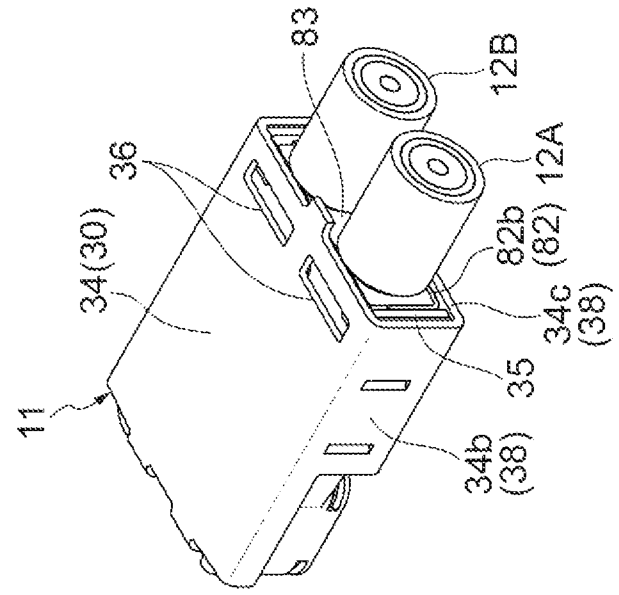
FIGS. 14A and 14B are diagrams illustrating additional operations of the example assembly method.
Figure 14A:
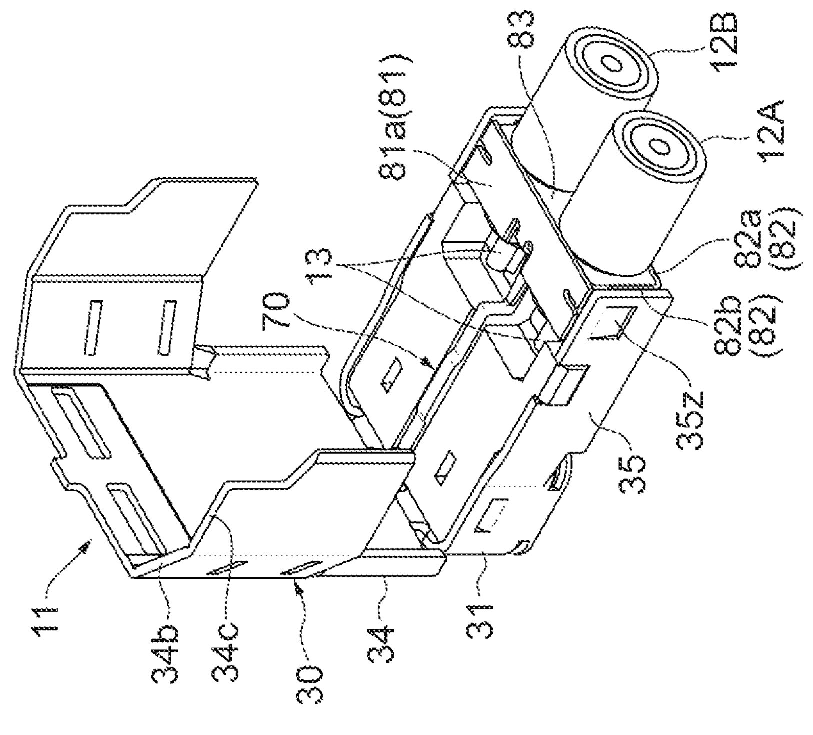

In the first step, as illustrated in FIG. 13A, the insulating housing 40 in which the conductive member 50 and the signal contact members 20A and 20B are integrally molded, and the isolation characteristic improvement part 70 are prepared. Then, by inserting the connection part 59 of the conductive member 50 into the insertion port 49 of the insulating housing 40 and fixing the isolation characteristic improvement part 70 to the recessed part 46 (cf. FIG. 3) of the insulating housing 40, the conductive member 50 and the like are integrated with the insulating housing 40, as illustrated in FIG. 13B.

Subsequently, as illustrated in FIG. 13C, the insulating housing 40 in which the conductive member 50 and the like are integrated is assembled with the ground contact member 30. For example, the insulating housing 40 is assembled with the ground contact member 30 such that the protruding part 91 of the insulating housing 40 is fitted into the recessed part 35*x* of the pair of arm parts 35 and 35 (cf. FIG. 13D).

Subsequently, as illustrated in FIG. 14A, the coaxial connector device 11 is mounted on the end parts of the coaxial cables 12A and 12B. At the time of a mounting process, the signal contact member 20A and the central conductor 13 of the coaxial cable 12A are connected to each other, and the signal contact member 20B and the central conductor 13 of the coaxial cable 12B are connected to each other. In addition, at the time of the mounting process, the plate-shaped part 81*a* of the upper ground bar 81 and the isolation characteristic improvement part 70 are brought into contact with each other, and the side wall part 82*b* of the lower ground bar 82 and the contact parts 35*z* of the pair of arm parts 35 and 35 are brought into contact with each other. Thereafter, the shell part 34 of the ground contact member 30 taking the upright position takes a bent position, and further, by bending the tightening parts 34*b* and 34*c*, a state in which the coaxial connector device 11 is mounted on the end parts of the coaxial cables 12A and 12B is firmly maintained, as illustrated in FIG. 14B. After the tightening parts 34*b* and 34*c* are bent, the penetrating part 36 and the like are filled with solder.

Next, action effects of the coaxial connector device 11 will be described.

The example coaxial connector device 11 includes: the ground bar 81 having the plate-shaped part 81*a* in contact with the outer conductors 15 of the coaxial cables 12A and 12B; the ground bar 82 having the plate-shaped part 82*a* configured to face the plate-shaped part 81*a* in the fitting direction, disposed so as to sandwich the coaxial cables 12A and 12B between the plate-shaped part 82*a* and the plate-shaped part 81*a*, and configured to contact the outer conductors 15 of the coaxial cables 12A and 12B; and the ground contact member 30 having a ground potential applied thereto, the ground contact member 30 being electrically connected to the outer conductors 15 of the coaxial cables 12A and 12B via the ground bars 81 and 82, in which the ground bar 82 has the side wall part 82*b* extending from an end part in the width direction of the plate-shaped part 82*a* toward the opposite plate-shaped part 81*a*, and the ground contact member 30 includes the contact part 35*z* that covers the side wall part 82*b* in the width direction and contacts the side wall part 82*b*.

In the example coaxial connector device 11, the plate-shaped parts 81*a* and 82*a* of the ground bars 81 and 82 in contact with the outer conductors 15 of the coaxial cables 12A and 12B are disposed so as to sandwich the coaxial cables 12A and 12B in the fitting direction. In the ground bar 82, the side wall part 82*b* extending in the fitting direction toward the opposite plate-shaped part 81*a* is formed, and the side wall part 82*b* is in contact with the contact part 35*z* of the ground contact member 30 covering the side wall part 82*b* in the width direction. As described above, the side wall part 82*b* extending to the side surface side (end part side in the width direction) of the coaxial cables 12A and 12B comes into contact with the ground contact member 30, thereby improving shielding property (EMI characteristic) on the side surface side of the coaxial cables 12A and 12B. As a result, noise resistance of the coaxial connector device 11 is improved, and it is possible to effectively prevent a signal inside the coaxial connector device 11 from propagating to surroundings and affecting surrounding external products.

The contact part 35*z* may have elasticity (or flexibility) in the width direction. In some examples, the contact part 35*z* may be biased inwardly in the width direction. According to such a configuration, even when the position of the cable fixing part 80 with respect to the ground contact member 30 deviates in the width direction, the deviation is absorbed by the contact part 35*z* having elasticity, and contact stability between the side wall part 82*b* and the contact part 35*z* can be improved. As a result, the above-described improvement in noise resistance can be more reliably achieved.

The ground contact member 30 includes: the annular fitting part 31 fitted and connected to the annular fitting part 130 of the mating connector device 100; the pair of arm parts 35 and 35 that is continuous with the annular fitting part 31 and extends in the extending direction so as to sandwich the coaxial cables 12A and 12B in a state of facing each other in the width direction; the base plate 34*a* covering the upper surface of the annular fitting part 31; and the first fixing part 38 and the second fixing part 39 continuously bent at the opposite end parts of the base plate 34*a* in the width direction so as to cover the arm parts 35 and configured to hold the coaxial cables 12A and 12B. The contact part 35*z* is formed in the pair of arm parts 35 and 35. According to such a configuration, the arm part 35 can be configured to be further covered with the first fixing part 38 and the second fixing part 39 while the arm part 35 is in contact with the side wall part 82*b* of the ground bar 82, thereby making it possible to improve shielding property on the side surface side of the coaxial cables 12A and 12B. As a result, the above-described improvement in noise resistance can be more reliably achieved.

Figure 15A:
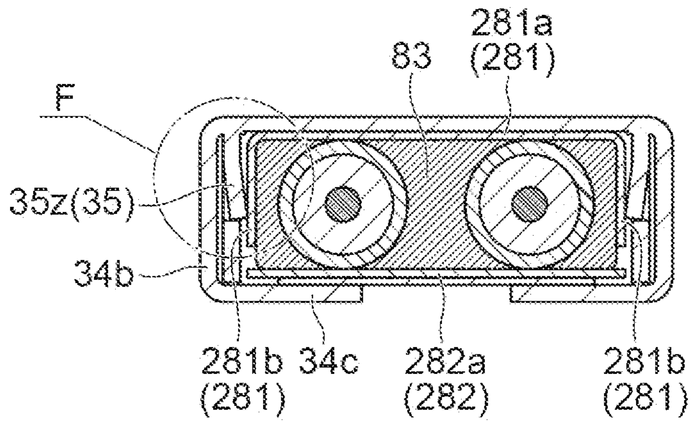
FIG. 15A is a cross-sectional view of a coaxial connector device according to another example, corresponding substantially to a cross-section taken along D-D of FIG. 8.
Figure 15B:
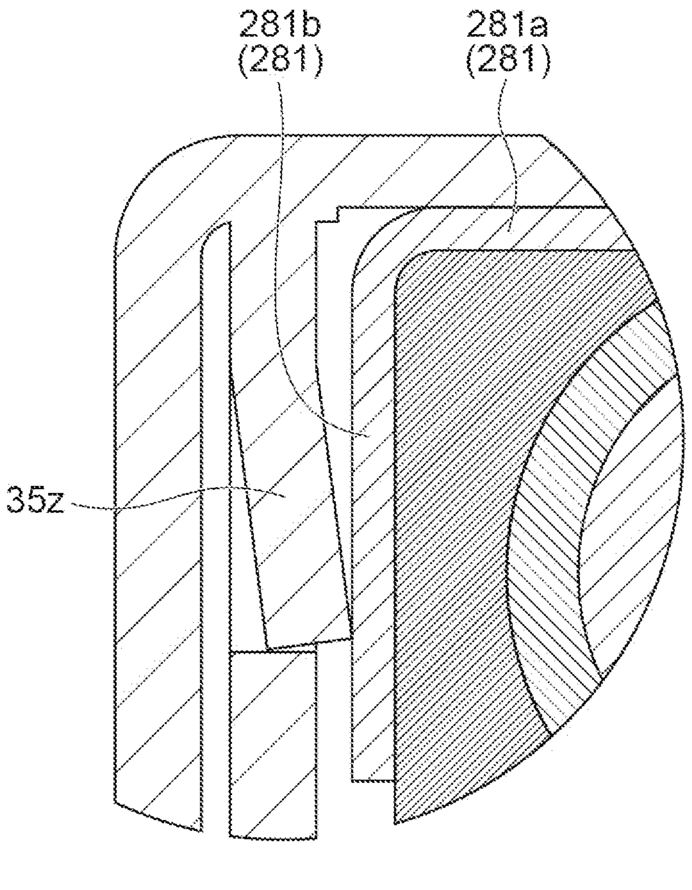
FIG. 15B is an enlarged view of a portion F illustrated in FIG. 15A.

It is to be understood that not all aspects, advantages and features described herein may necessarily be achieved by, or included in, any one particular example. Indeed, having described and illustrated various examples herein, it should be apparent that other examples may be modified in arrangement and detail. For example, in the above-described examples, it has been described that the side wall part 82*b* extending from the lower ground bar 82 and the contact part 35*z* of the ground contact member 30 are in contact with each other. However in other examples, the side wall part extending from the upper ground bar and the contact part 35*z* may be in contact with each other. FIG. 15A is a cross-sectional view illustrating a cross section (cross section corresponding to cross section taken along line D-D in FIG. 12A) of a coaxial connector device according to a modification. FIG. 15B is an enlarged view of a portion F illustrated in FIG. 15A. In the coaxial connector device illustrated in FIG. 15A, an upper ground bar 281 having a plate-shaped part 281*a* and a lower ground bar 282 having a plate-shaped part 282*a* disposed so as to sandwich a coaxial cable between the plate-shaped part 282*a* and the plate-shaped part 281*a* are provided. A side wall part 281*b* extending from an end part in the width direction of the plate-shaped part 281*a* of the upper ground bar 281 toward the opposite plate-shaped part 282*a* is formed, and as illustrated in FIG. 15B, the side wall part 281*b* and the contact part 35*z* can be in contact with each other. Even with such a configuration, similarly to the coaxial connector device 11 described above, shielding property can be improved and noise resistance can be improved.

Figure 16A:
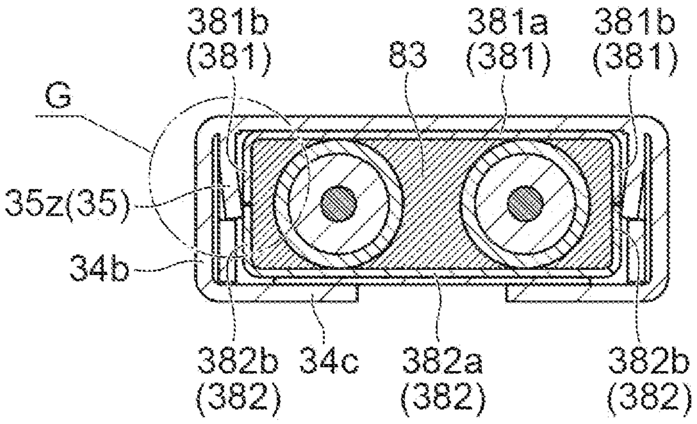
FIG. 16A is a cross-sectional view of a coaxial connector device according to another example, corresponding substantially to a cross-section taken along D-D of FIG. 8.
Figure 16B:
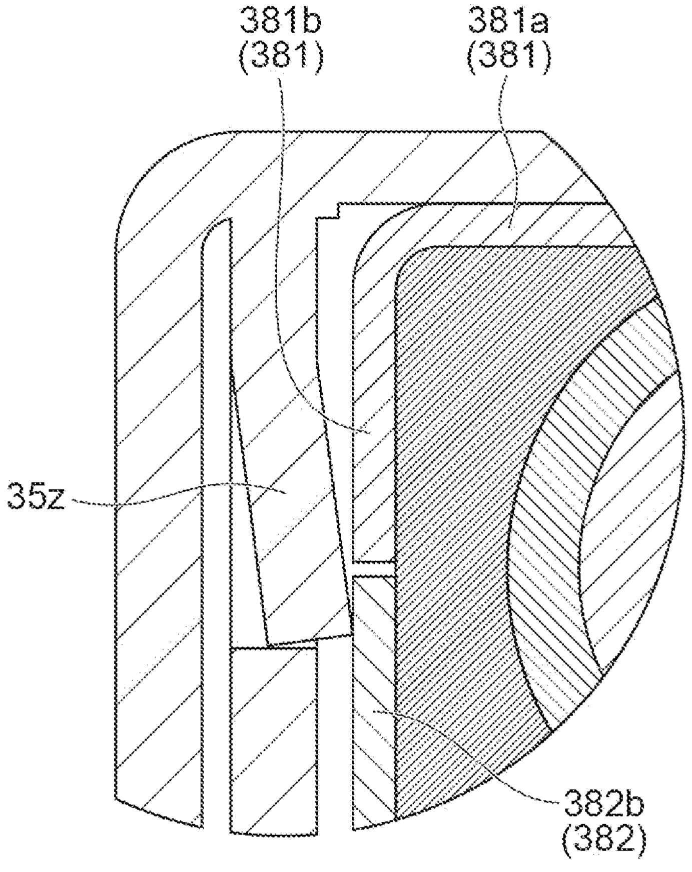
FIG. 16B is an enlarged view of a portion G illustrated in FIG. 16A.

Further, the side wall part may extend from both the upper ground bar and the lower ground bar, and the contact part 35*z* may be in contact with any one of the contact parts. FIG. 16A is a cross-sectional view illustrating a cross section (cross section corresponding to cross section taken along line D-D in FIG. 12A) of a coaxial connector device according to a further modification. FIG. 16B is an enlarged view of a portion G illustrated in FIG. 16A. In the coaxial connector device illustrated in FIG. 16A, an upper ground bar 381 having a plate-shaped part 381*a* and a lower ground bar 382 having a plate-shaped part 382*a* disposed so as to sandwich a coaxial cable between the plate-shaped part 382*a* and the plate-shaped part 381*a* are provided. A side wall part 381*b* extending from an end part in the width direction of the plate-shaped part 381*a* of upper ground bar 381 toward the plate-shaped part 382*a* is formed, and a side wall part 382*b* extending from an end part in the width direction of the plate-shaped part 382*a* of the lower ground bar 382 toward the plate-shaped part 381*a* is formed. As illustrated in FIG. 16B, in the present modification, the side wall part 382*b* and the contact part 35*z* are in contact with each other, but the side wall part 381*b* and the contact part 35*z* may be in contact with each other. Even with such a configuration, similarly to the coaxial connector device 11 described above, shielding property can be improved and noise resistance can be improved.

Figure 17A:
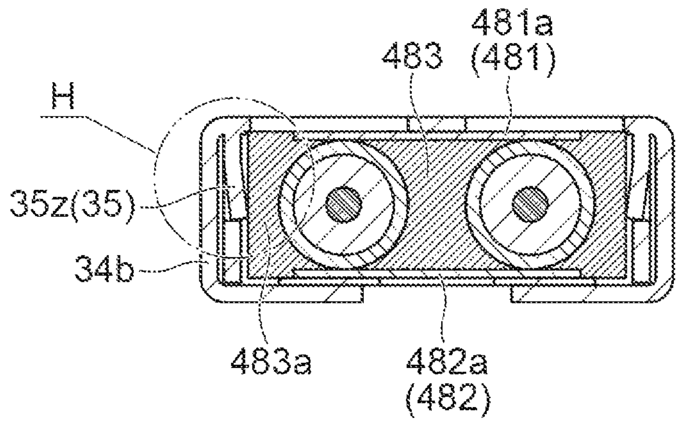
FIG. 17A is a cross-sectional view of a coaxial connector device according to another example, corresponding substantially to a cross-section taken along D-D of FIG. 8.
Figure 17B:
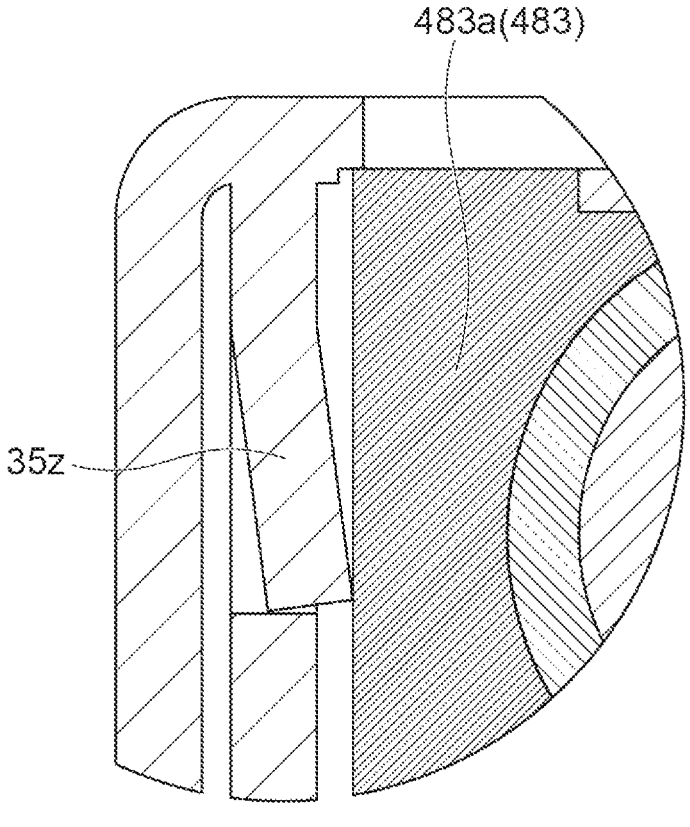
FIG. 17B is an enlarged view of a portion H illustrated in FIG. 17A.

Further, in the above-described examples, the side wall part 82*b* extending from the ground bar 82 and the contact part 35*z* of the ground contact member 30 are in contact with each other. However in other examples, the contact part 35*z* may be in contact with a solder part that fixes a coaxial cable filled so as to cover the outer conductor of the coaxial cable. FIG. 17A is a cross-sectional view illustrating a cross section (cross section corresponding to cross section taken along line D-D in FIG. 12A) of a coaxial connector device according to a further modification. FIG. 17B is an enlarged view of a portion H illustrated in FIG. 17A. In the coaxial connector device illustrated in FIG. 17A, a solder part 483 has an outward filling part 483*a* filled outwards in the width direction of the coaxial cable, and as illustrated in FIG. 17B, the outward filling part 483*a* of the solder part 483 and the contact part 35*z* are in contact with each other. As described above, a portion of the solder part 483 filled outwards (side surface side) in the width direction of the coaxial cable comes into contact with the ground contact member 30, thereby improving shielding property (EMI characteristic) on the side surface side of the coaxial cable. As a result, noise resistance of the coaxial connector device is improved, and it is possible to effectively prevent a signal inside the coaxial connector device from propagating to surroundings and affecting surrounding external products.

Figure 18:
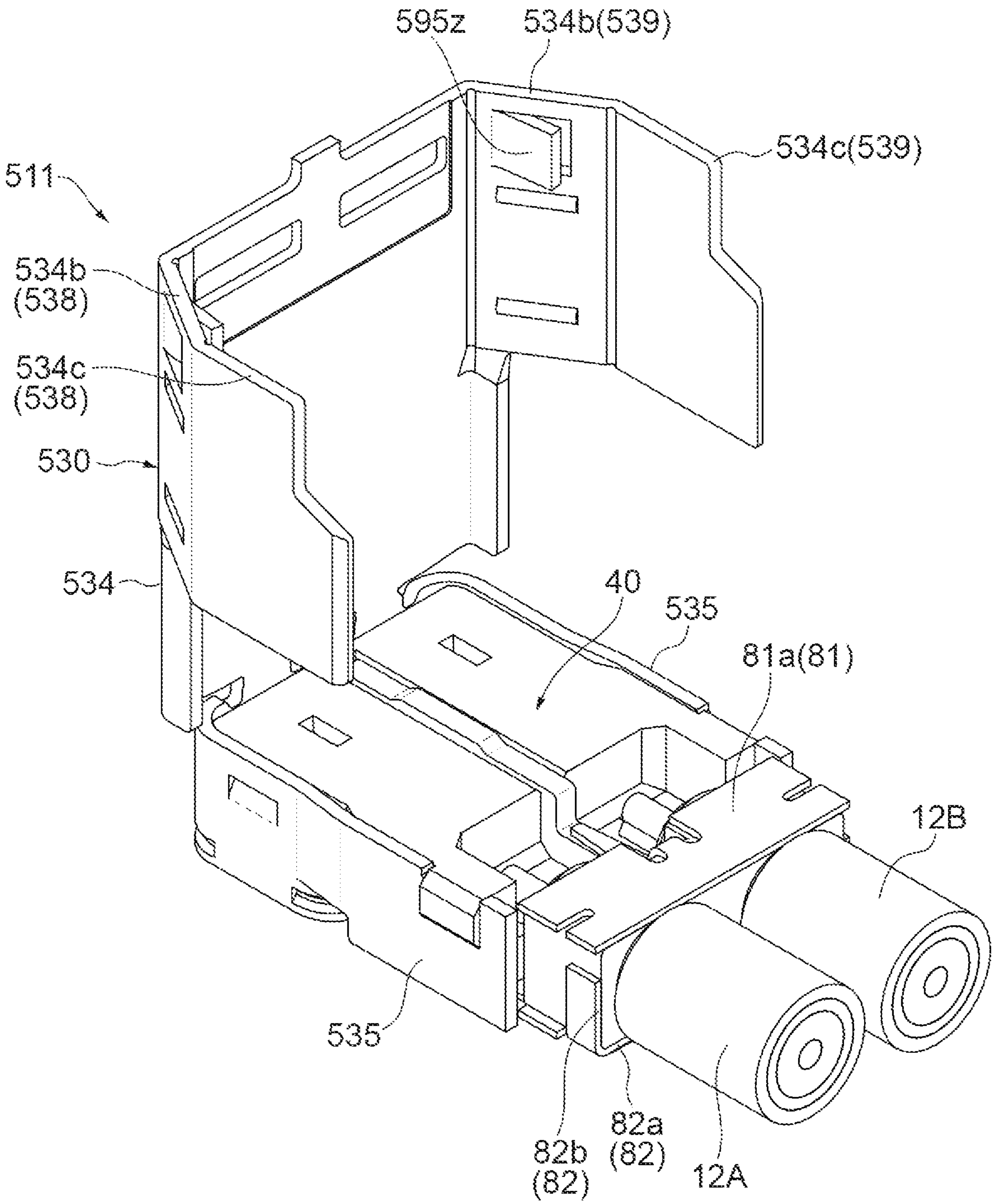
FIG. 18 is a perspective view illustrating a coaxial connector device according to a further example, during an operation of mounting coaxial cables thereto.
Figure 19:
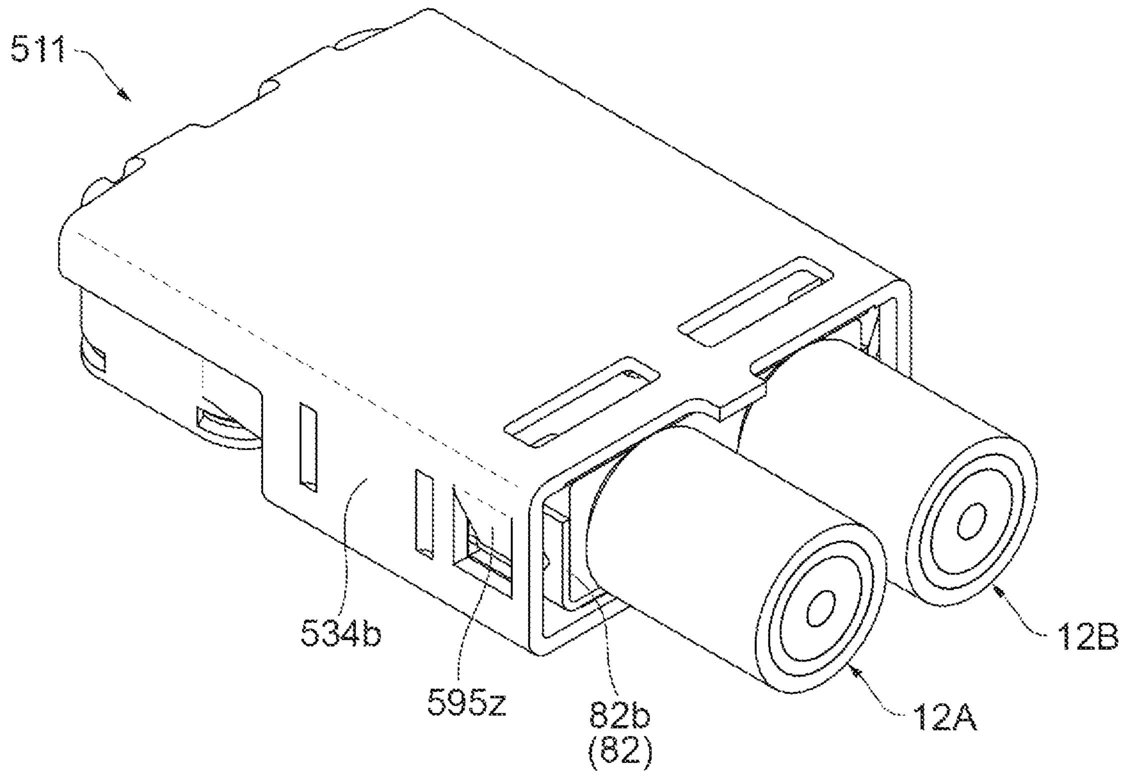
FIG. 19 is a perspective view of the coaxial connector device illustrated in FIG. 18 with the coaxial cables mounted thereto.
Figure 20A:
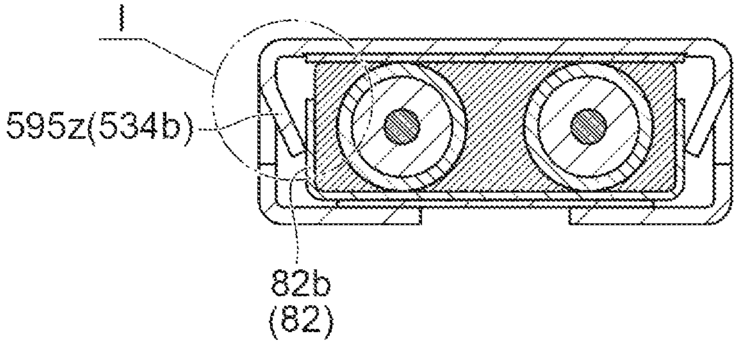
FIG. 20A is a cross-sectional view of the coaxial connector device illustrated in FIG. 18, corresponding substantially to a cross-section taken along D-D of FIG. 8.
Figure 20B:
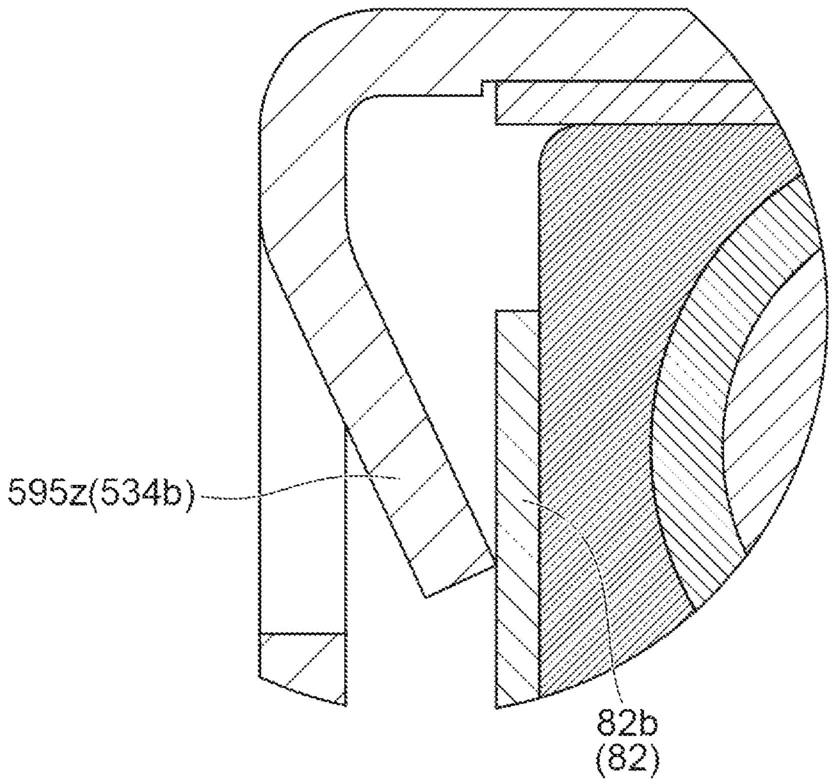
FIG. 20B is an enlarged view of a portion I illustrated in FIG. 20A.

Additionally, in the above-described examples, the contact parts 35*z* of the pair of arm parts 35 and 35 are in contact with the side wall part 82*b* of the ground bar 82. However in other examples, contact parts formed on the first fixing part and the second fixing part, which are the barrel parts, may be in contact with the side wall part of the ground bar. FIG. 18 is a perspective view illustrating a process in which a coaxial connector device 511 according to a further modification is mounted on end parts of the coaxial cables 12A and 12B. FIG. 19 is a perspective view illustrating a state in which the coaxial connector device 511 illustrated in FIG. 18 is mounted on the end parts of the coaxial cables 12A and 12B as viewed from above. FIG. 20A is a cross-sectional view illustrating a cross section of the coaxial connector device illustrated in FIG. 18 (cross section corresponding to cross section taken along line D-D in FIG. 12A). FIG. 20B is an enlarged view of a portion I illustrated in FIG. 20A. As illustrated in FIG. 18, in the present configuration, a pair of arm parts 535 and 535 does not extend to a region of the cable fixing part including the ground bars 81 and 82. As illustrated in FIGS. 18 and 19, a first fixing part 538 and a second fixing part 539, which are a pair of barrel parts, are respectively provided with contact parts 595*z* that come into contact with the side wall part 82*b*. That is, the first fixing part 538 and the second fixing part 539 include a tightening part 534*b* that covers the cable fixing part from the outside in the width direction and a tightening part 534*c* that covers the cable fixing part from the lower side, and the contact part 595*z* formed by being bent inwards in the width direction is formed in the tightening part 534*b*. As illustrated in FIGS. 20A and 20B, the contact part 595*z* of the tightening part 534*b* is configured to contact the side wall part 82*b* of the ground bar 82. According to such a configuration, as long as the tightening part 534*b* of the barrel part extends to a contact region with the side wall part 82*b*, contact between the side wall part 82*b* and the contact part 595*z* can be realized, and noise resistance can be improved while a configuration in the contact region is simplified.

The invention claimed is:

1. An electrical connector comprising:

a first ground bar having a first plate-shaped part configured to contact an outer conductor of a coaxial cable;

a second ground bar having a second plate-shaped part facing the first plate-shaped part in a fitting direction, to position the coaxial cable between the first plate-shaped part and the second plate-shaped part, wherein the second plate-shaped part is configured to contact the outer conductor of the coaxial cable, and wherein the second ground bar has an end part in a width direction intersecting the fitting direction and an extending direction of the coaxial cable, and a side wall part extending from the end part toward the first plate-shaped part; and a ground contact member configured to have a ground potential applied thereto, and to be electrically connected to the outer conductor of the coaxial cable via the first ground bar and the second ground bar, wherein the ground contact member has a contact part configured to at least partially cover the side wall part in the width direction and to contact the side wall part of the second ground bar.

2. The electrical connector according to claim 1, wherein the contact part has elasticity in the width direction.

3. The electrical connector according to claim 1, wherein the ground contact member includes an annular fitting part fitted and connected to an annular part of a mating connector in the fitting direction, a pair of arm parts continuous with the annular fitting part, the arm parts extending in the extending direction and facing each other in the width direction so as to position the coaxial cable between the arm parts, a base part covering an upper surface of the annular fitting part and having opposite end parts in the width direction, and a pair of barrel parts extending continuously from the opposite end parts of the base part, the pair of barrel parts being bent relative to the base part so as to cover the arm parts and hold the coaxial cable, and wherein the contact part is formed on the pair of arm parts.

4. The electrical connector according to claim 1, wherein the ground contact member includes an annular fitting part fitted and connected to an annular part of a mating connector in the fitting direction, a pair of arm parts continuous with the annular fitting part, the arm parts extending in the extending direction and facing each other in the width direction so as to position the coaxial cable between the arm parts, a base part covering an upper surface of the annular fitting part and having opposite end parts in the width direction, and a pair of barrel parts extending continuously from the opposite end parts of the base part, the pair of barrel parts being bent relative to the base part so as to cover the arm parts and hold the coaxial cable, and wherein the contact part is formed on the pair of barrel parts.

5. An electrical connector comprising:

a solder part configured to cover an outer conductor of a coaxial cable and to fix the coaxial cable in the electrical connector; and a ground contact member configured to have a ground potential applied thereto, the ground contact member being connected to a mating connector in a fitting direction, and including a contact part configured to be electrically connected to the outer conductor of the coaxial cable via the solder part, wherein the solder part includes an outward filling part located outwardly of the coaxial cable in a width direction, the width direction intersecting an extending direction of the coaxial cable and the fitting direction, and wherein the contact part of the ground contact member at least partially covers the outward filling part in the width direction and contacts the outward filling part.

6. The electrical connector according to claim 5, wherein the contact part has elasticity in the width direction.

7. The electrical connector according to claim 5, wherein the ground contact member includes an annular fitting part fitted and connected to an annular part of the mating connector, a pair of arm parts continuous with the annular fitting part, the arm parts extending in the extending direction and facing each other in the width direction so as to position the coaxial cable between the arm parts, a base part covering an upper surface of the annular fitting part and having opposite end parts in the width direction, and a pair of barrel parts extending continuously from the opposite end parts of the base part, the pair of barrel parts being bent relative to the base part so as to cover the arm parts and hold the coaxial cable, and wherein the contact part is formed on the pair of arm parts.

8. The electrical connector according to claim 5, wherein the ground contact member includes an annular fitting part fitted and connected to an annular part of the mating connector, a pair of arm parts continuous with the annular fitting part, the arm parts extending in the extending direction and facing each other in the width direction so as to position the coaxial cable between the arm parts, a base part covering an upper surface of the annular fitting part and having opposite end parts in the width direction, and a pair of barrel parts extending continuously from the opposite end parts of the base part, the pair of barrel parts being bent relative to the base part so as to cover the arm parts and hold the coaxial cable, and wherein the contact part is formed on the pair of barrel parts.

9. An electrical connector comprising:

a first ground bar having a first plate configured to be electrically connected with an outer conductor of a coaxial cable, wherein the first plate extends in a width direction of the electrical connector that is orthogonal to an extension direction of the coaxial cable;

a second ground bar having a second plate facing the first plate in a height direction, to position the coaxial cable between the first plate and the second plate, wherein the second plate is configured to be electrically connected with the outer conductor of the coaxial cable; and a ground contact member configured to be imparted with a ground potential, wherein the ground contact member substantially encases the first ground bar and the second ground bar, and wherein the ground contact member includes a contact part that is offset from the first plate and the second plate in the width direction and that extends toward the first plate and the second plate in the width direction to be electrically connected to the first plate and to the second plate.

10. The electrical connector according to claim 9, wherein the electrical connector is configured to accommodate two coaxial cables that are arranged in the width direction, and wherein the first plate and the second plate are configured to contact outer conductors of the two coaxial cables.

11. The electrical connector according to claim 9, wherein the contact part is biased toward the first plate and the second plate in the width direction.

12. The electrical connector according to claim 9, wherein the second plate of the second ground bar has an end in the width direction, wherein the second ground bar has a side wall extending from the end of the second plate toward the first plate, and wherein the contact part of the ground contact member at least partially overlaps the side wall and contacts the side wall.

13. The electrical connector according to claim 9, wherein the ground contact member includes a fitting part extending in the height direction and connected to a mating connector, a pair of arm parts extending from the fitting part in the extending direction and facing each other in the width direction so as to position the coaxial cable between the arm parts, a base part covering an upper surface of the fitting part and having opposite ends in the width direction, and a pair of barrel parts extending from the opposite ends of the base part to cover the arm parts and to hold the coaxial cable.

14. The electrical connector according to claim 13, wherein the pair of arm parts of the ground contact member includes a first arm part and a second arm part facing the first arm part, wherein the contact part is a first contact part of the ground contact member that is formed on the first arm part, and wherein the ground contact member includes a second contact part formed on the second arm part.

15. The electrical connector according to claim 13, wherein the pair of barrel parts of the ground contact member includes a first barrel part and a second barrel part facing the first barrel part, wherein the contact part is a first contact part of the ground contact member that is formed on the first barrel part, and wherein the ground contact member includes a second contact part formed on the second barrel part.

16. The electrical connector according to claim 13, wherein the base plate contacts the first plate along the width direction, and wherein the barrel parts of the ground contact member include first portions extending from the opposite ends of the base part in the height direction to cover the arm parts, and second portions extending from the first portions to contact the second plate along the width direction.

17. The electrical connector according to claim 9, further comprising a solder part filling a space between the first plate and the second plate and the outer conductor of the coaxial cable to fix the coaxial cable in the electrical connector, wherein the contact part of the ground contact member contacts the solder part at a contact point that is offset from the coaxial cable in the width direction.

18. An electrical connector to be electrically coupled with a mating connector, the electrical connector comprising:

a first ground bar having a first plate-shaped part configured to contact an outer conductor of a coaxial cable;

a second ground bar having a second plate-shaped part facing the first plate-shaped part, to interpose the coaxial cable between the first plate-shaped part and the second plate-shaped part, wherein the second plate-shaped part is configured to contact the outer conductor of the coaxial cable;

a ground contact member configured to be imparted with a ground potential, and to be electrically connected to the outer conductor of the coaxial cable via the first ground bar and the second ground bar;

a conductive member configured to be electrically connected to the second ground bar, and to contact a ground contact part of the mating connector; and an isolation characteristic improvement part that is in contact with the conductive member so as to be electrically connected to the second ground bar.

19. The electrical connector according to claim 18, wherein the isolation characteristic improvement part is additionally in contact with at least one of the first ground bar or the ground contact member.

20. The electrical connector according to claim 18, further comprising two signal contact members configured to connect with signal contact parts of the mating connector, wherein the isolation characteristic improvement part extends between the two signal contact members to prevent signal propagation, and wherein the conductive member includes a flat plate that is configured to be electrically connected to the ground contact member to impart the ground potential from the mating connector to the ground contact member.

* * * * *